United States Patent
Khoshnevis et al.

(10) Patent No.: US 8,437,705 B2
(45) Date of Patent: May 7, 2013

(54) RESOURCE ALLOCATION AND ENCODING FOR CHANNEL QUALITY INDICATOR (CQI) AND CQI COLLIDED WITH UPLINK ACKNOWLEDGMENT/NEGATIVE ACKNOWLEDGMENT

(75) Inventors: Ahmad Khoshnevis, Portland, OR (US);
Shohei Yamada, Camas, WA (US);
Zhanping Yin, Vancouver, WA (US);
Sayantan Choudhury, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 396 days.

(21) Appl. No.: 12/902,109

(22) Filed: Oct. 11, 2010

(65) Prior Publication Data
US 2012/0088533 A1 Apr. 12, 2012

(51) Int. Cl.
H04B 1/00 (2006.01)
H04B 7/00 (2006.01)
H04W 72/00 (2009.01)

(52) U.S. Cl.
USPC .......................................... 455/69; 455/452.1

(58) Field of Classification Search ................. 455/450, 455/452.1, 452.2, 509, 69; 370/328, 329; 714/746, 748, 749, 756
See application file for complete search history.

(56) References Cited

U.S. PATENT DOCUMENTS

| | | | |
|---|---|---|---|
| 2009/0196247 A1 | 8/2009 | Fan et al. | |
| 2010/0098012 A1 | 4/2010 | Bala et al. | |
| 2010/0103860 A1 | 4/2010 | Kim et al. | |
| 2010/0303011 A1* | 12/2010 | Pan et al. | 370/328 |
| 2012/0082157 A1* | 4/2012 | Yamada et al. | 370/389 |
| 2012/0320826 A1* | 12/2012 | Kim et al. | 370/328 |

FOREIGN PATENT DOCUMENTS

| | | |
|---|---|---|
| WO | 2009/100069 | 8/2009 |
| WO | 2010/048142 | 4/2010 |

OTHER PUBLICATIONS

3GPP TS 36.213 V8.6.0, "Evolved Universal Terrestrial Radio Access (E-UTRA) Physical layer procedures (Release 8)," Mar. 2009.
3GPP TS 36.212 V9.0.0, "Evolved Universal Terrestrial Radio Access (E-UTRA); Multiplexing and Channel Coding (Release 9)," Dec. 2009.
3GPP TS 36.331 V9.1.0, "Evolved Universal Terrestrial Radio Access (E-UTRA) Radio Resource Control (RRC); Protocol specification (Release 9)," Dec. 2009.
CATT, "Periodic/Aperiodic CQI Feedback with CA," 3GPP TSG RAN WG1 Meeting #62, R1-104316, Aug. 2010.
Panasonic, HTC Corporation, "Aperiodic CQI Reporting for Carrier Aggregation," 3GPP TSG-RAN WG1 Meeting 61bis, R1-103761, Jul. 2010.
International Search Report issued for International Patent Application No. PCT/JP2011/071173 on Nov. 8, 2011.

* cited by examiner

*Primary Examiner* — Nguyen Vo
(74) *Attorney, Agent, or Firm* — Austin Rapp & Hardman

(57) ABSTRACT

A User Equipment (UE) configured for allocating resources and encoding for Channel Quality Indicator (CQI) is described. The UE includes a processor and instructions stored in memory. The UE receives Radio Resource Control (RRC) signaling, receives a reference signal and determines a Channel Quality Indicator (CQI) based on the reference signal. The UE also determines a format for CQI transmission. If use of Format 3 is determined the UE determines cells for CQI reporting based on the RRC signaling and determines an encoding. The UE also encodes a feedback message based on the encoding and transmits the feedback message.

59 Claims, 17 Drawing Sheets

RESOURCE ALLOCATION AND ENCODING FOR CHANNEL QUALITY INDICATOR (CQI) AND CQI COLLIDED WITH UPLINK ACKNOWLEDGMENT/NEGATIVE ACKNOWLEDGMENT

TECHNICAL FIELD

The present disclosure relates generally to communication systems. More specifically, the present disclosure relates to resource allocation and encoding for Channel Quality Indicator (CQI) and CQI collided with uplink acknowledgment/negative acknowledgment.

BACKGROUND

Wireless communication devices have become smaller and more powerful in order to meet consumer needs and to improve portability and convenience. Consumers have become dependent upon wireless communication devices and have come to expect reliable service, expanded areas of coverage, and increased functionality. A wireless communication system may provide communication for a number of wireless communication devices, each of which may be serviced by a base station. A base station may be a fixed station that communicates with wireless communication devices.

As wireless communication devices have advanced, improvements in communication quality have been sought. One way to increase communication quality is to use an Acknowledgment/Negative Acknowledgment (ACK/NACK) scheme. For example, a NACK may indicate a failure in the correct reception of information, allowing a retransmission of the incorrectly received information.

Wireless communication devices and base stations may communicate several different kinds of feedback information, such as the ACK/NACKs described above. Channel quality indicators (CQIs) are another kind of feedback information. As illustrated by this discussion, improved systems and methods for formatting feedback information may be beneficial.

DETAILED DESCRIPTION

Figure 1:
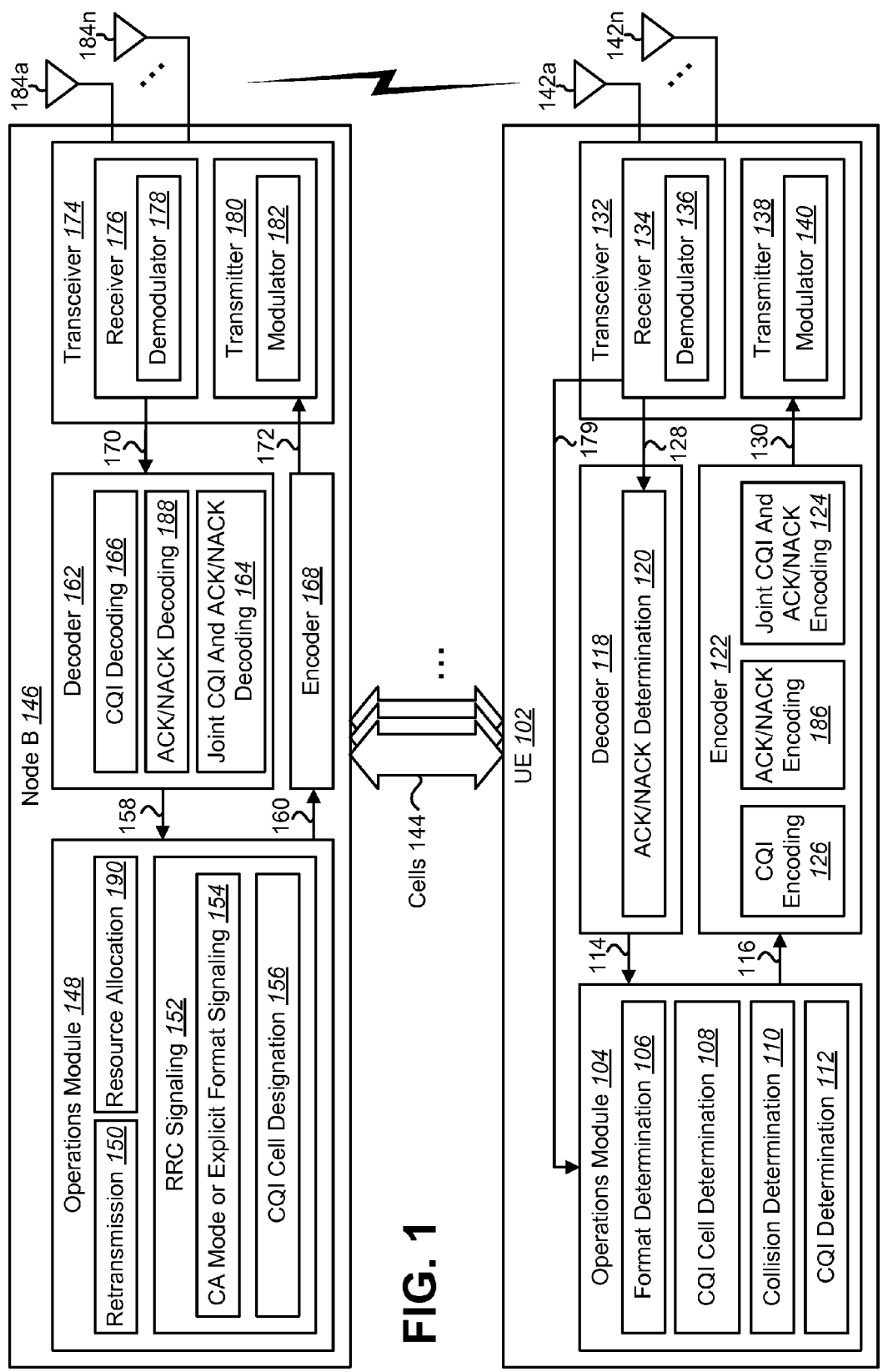
FIG. 1 is a block diagram illustrating one configuration of a User Equipment (UE) in which systems and methods for resource allocation and encoding for Channel Quality Indicator (CQI) and CQI collided with uplink acknowledgment/negative acknowledgment (ACK/NACK) may be implemented.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (e.g., Release-8 and Release-10). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a User Equipment (UE), an access terminal, a subscriber station, a mobile terminal, a remote station, a user terminal, a terminal, a subscriber unit, a mobile device, etc. A wireless communication device may be a cellular phone, a smart phone, a personal digital assistant (PDA), a laptop computer, a netbook, an e-reader, a wireless modem, etc. In 3GPP specifications, a wireless communication device is typically referred to as a User Equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved or enhanced Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

The term "simultaneous" may be used herein to denote a situation where two or more events occur in overlapping time frames. In other words, two "simultaneous" events may overlap in time to some extent, but are not necessarily of the same duration. Furthermore, simultaneous events may or may not begin or end at the same time.

It should be noted that the terms "encoding," "encodes," "encoded," and other variations of the word "encode" may be used synonymously with similar variations of the word "code."

It should also be noted that as used herein, a "cell" may be any communication channel that is specified by standardizations or regulatory bodies to be used for International Mobile Telecommunications-Advanced (IMT-Advanced) and all of it or a subset of it may be adopted by 3GPP as licensed bands to be used for communication between a Node B (e.g., eNodeB) and a UE. "Configured cells" are those cells of which the UE is aware and is allowed by Node B (e.g., eNodeB) to transmit or receive information. The UE may receive system information and perform the required measurements on all configured cells. "Activated cells" are those configured cells on which the UE is transmitting and receiving. That is, activated cells are those cells for which the UE monitors the PDCCH and in the case of a downlink transmission, those cells for which the UE decodes a Physical Downlink Shared Channel (PDSCH). "Deactivated cells" are those configured cells that the UE is not monitoring the transmission PDCCH.

A User Equipment (UE) configured for allocating resources and encoding for Channel Quality Indicator (CQI) is disclosed. The UE includes a processor and instructions stored in memory. The UE receives Radio Resource Control (RRC) signaling, receives a reference signal and determines a Channel Quality Indicator (CQI) based on the reference signal. The UE also determines a format for CQI transmission and if use of Format 3 is determined, the UE determines cells for CQI reporting based on the RRC signaling, determine an encoding, encodes a feedback message based on the encoding and transmits the feedback message.

Determining a format may be based on whether the UE is in a Carrier Aggregation (CA) mode. Determining a format may be based on an explicit format indicator specified by the RRC signaling. Determining cells for CQI reporting may be based on the RRC signaling, where the RRC signaling includes CQI cell indices. Determining the encoding may be based on a designated number of CQI bits. The encoding may be convolutional encoding if there are more than a threshold number of CQI bits and the encoding is a Reed-Muller encoding if there is the threshold number or fewer CQI bits. The threshold number may be 11.

Determining the encoding may be based on an explicit encoding indicator specified by the RRC signaling. The encoding may be a convolutional encoding if convolutional encoding is indicated by the explicit encoding indicator and the encoding may be a Reed-Muller encoding if Reed-Muller encoding is indicated by the explicit encoding indicator.

Determining the encoding may be based on an encoding mode indicator, a number of CQI bits and an explicit encoding indicator. The UE may also encode CQI bits using convolutional encoding if the encoding mode indicator indicates an implicit encoding mode and there are more than a designated number of CQI bits and encode the CQI bits using Reed-Muller encoding if the encoding mode indicator indicates an implicit encoding mode and there are less than or equal to the designated number of CQI bits. The UE may also encode the CQI bits using convolutional encoding if the encoding mode indicator indicates an explicit encoding mode and the explicit encoding indicator indicates convolutional encoding and encode the CQI bits using Reed-Muller encoding if the encoding mode indicator indicates an explicit encoding mode and the explicit encoding indicator indicates Reed-Muller encoding.

The UE may also, if the use of Format 3 for CQI transmission is determined, determine Format 3 resources specified by a resource indicator, determine whether there is a collision between the CQI and an Acknowledgment/Negative Acknowledgment (ACK/NACK) and determine whether simultaneous CQI and ACK/NACK reporting is permitted if there is a collision between the CQI and the ACK/NACK.

The UE may also, if simultaneous CQI and ACK/NACK reporting is not permitted, drop the CQI and transmit the ACK/NACK. The UE may also determine whether the ACK/NACK is set for transmission using Format 1a/1b with channel selection if simultaneous CQI and ACK/NACK reporting is permitted.

The UE may also, if ACK/NACK is not set for transmission using Format 1a or Format 1b with channel selection, determine whether ACK/NACK compression is allowed, jointly encode the CQI and the ACK/NACK if ACK/NACK compression is not allowed and transmit the CQI and ACK/NACK using Format 3 ACK/NACK resources if ACK/NACK compression is not allowed.

The UE may also, if ACK/NACK compression is allowed, determine whether there is a normal Cyclic Prefix (CP), transmit the ACK/NACK using a Format 3a or a Format 3b if there is a normal CP, jointly encode the CQI and the ACK/NACK if there is not a normal CP and transmit the CQI and the ACK/NACK using Format 3 CQI resources if there is not a normal CP.

The UE may also compress the ACK/NACK to fewer bits. The UE may also, if ACK/NACK is set for transmission using Format 1a or Format 1b with channel selection, determine whether ACK/NACK compression is allowed, jointly encode the CQI and ACK/NACK if ACK/NACK compression is not allowed and transmit the CQI and the ACK/NACK using Format 3 CQI resources if ACK/NACK compression is not allowed. The UE may also, if ACK/NACK compression is allowed, determine whether there is an extended CP and transmit the ACK/NACK using Format 3a or Format 3b if there is not an extended CP.

The UE may also compress the ACK/NACK to fewer bits. The UE may also, if there is an extended CP, jointly encode the CQI and the ACK/NACK; and transmit the CQI and the ACK/NACK using Format 3 resources. The UE may also, if there is an extended CP, drop the CQI and transmit the ACK/NACK.

The UE may also provide unequal error protection between the CQI and the ACK/NACK if simultaneous CQI and ACK/NACK reporting is permitted. The UE may also, if simultaneous CQI and ACK/NACK reporting is permitted, determine whether an ACK/NACK Resource Indicator (ARI) indicates a resource that is the same as a CQI resource and drop the CQI and transmit the ACK/NACK on an ARI resource if the ARI does not indicate a resource that is the same as the CQI resource.

The UE may also, if simultaneous CQI and ACK/NACK reporting is permitted, determine whether an ACK/NACK Resource Indicator (ARI) indicates a resource that is the same as a CQI resource and drop the CQI and transmit ACK/NACK on the CQI resource if the ARI does not indicate a resource that is the same as the CQI resource.

The UE may also, if simultaneous CQI and ACK/NACK reporting is permitted, determine whether an ACK/NACK Resource Indicator (ARI) indicates a resource that is the same as a CQI resource and ignore a Physical Downlink Control Channel (PDCCH) if the ARI does not indicate a resource that is the same as the CQI resource.

The UE may also, if simultaneous CQI and ACK/NACK reporting is permitted, determine whether an ACK/NACK Resource Indicator (ARI) indicates a resource that is the same as a CQI resource, encode the CQI and the ACK/NACK if the ARI indicates a resource that is the same as the CQI resource and transmit the CQI and the ACK/NACK if the ARI indicates a resource that is the same as the CQI resource.

Encoding the CQI and the ACK/NACK may include one of jointly encoding and separately encoding. The UE may also compress or drop CQI bits based on a Format 3 capacity if simultaneous CQI and ACK/NACK reporting is permitted. The UE may also compress or drop ACK/NACK bits based on a Format 3 capacity if simultaneous CQI and ACK/NACK reporting is permitted.

A method for allocating resources and encoding for Channel Quality Indicator (CQI) is also disclosed. The method includes receiving Radio Resource Control (RRC) signaling, receiving a reference signal and determining a Channel Quality Indicator (CQI) based on the reference signal. The method also includes determining, by a User Equipment (UE), a format for CQI transmission and if use of Format 3 is determined, then, determining cells for CQI reporting based on the RRC signaling, determining an encoding, encoding a feedback message based on the encoding and transmitting the feedback message.

A non-transitory, tangible computer-readable medium for allocating resources and encoding for Channel Quality Indicator (CQI) is also disclosed. The computer-readable medium includes executable instructions for receiving Radio Resource Control (RRC) signaling, receiving a reference signal and determining a Channel Quality Indicator (CQI) based on the reference signal. The computer-readable medium also includes executable instructions for determining a format for CQI transmission and if use of Format 3 is determined, then determining cells for CQI reporting based on the RRC signaling, determining an encoding, encoding a feedback message based on the encoding and transmitting the feedback message.

The systems and methods disclosed herein describe resource allocation and encoding for Channel Quality Indicator (CQI) information and for CQI collided with uplink Acknowledgment/Negative Acknowledgment (ACK/NACK). In particular, the systems and methods disclosed herein address the problems of resource allocation and coding required for transmission of CQI and resource allocation and coding required for transmission of CQI collided with transmission of ACK/NACK (which may be denoted Acknowledgement/Negative Acknowledgment, Hybrid Automatic Repeat Request (ARQ), ACK/NACK, HARQ ACK/NACK, ACK/NACK, or A/N). The systems and methods disclosed herein may be applicable to Release 10 of 3GPP known as LTE-Advanced and later releases.

In Release-8 and Release-9 (known as LTE or Long Term Evolution), a provisioned payload for periodic CQI is 1-11 bits, which are encoded using a Reed-Muller (RM) encoding. The Reed-Muller encoder may take the 1 to 11 input bits and generate 20 encoded bits (regardless of the length of the input bits). The encoded bits may be transmitted on a Physical Uplink Control Channel (PUCCH) using Format 2. Format 2 communication resources are allocated semi-statically via higher layer (e.g., Radio Resource Control or RRC) signaling. For example, Listing (1) illustrates an excerpt from the 3GPP technical specification 36331-930 providing a CQI-ReportConfig parameter.

Listing (1)

```
-- ASN1START
CQI-ReportConfig ::= SEQUENCE {
    cqi-ReportModeAperiodic ENUMERATED {
        rm12, rm20, rm22, rm30, rm31,
        spares, spare2, spare1} OPTIONAL,    -- Need OR
    nomPDSCH-RS-EPRE-Offset INTEGER (-1..6),
    cqi-ReportPeriodic CQI-ReportPeriodic    -- Need ON
    OPTIONAL
}
CQI-ReportConfig-v920 ::= SEQUENCE {
    cqi-Mask-r9 ENUMERATED {setup}           -- Cond cqi-Setup
    OPTIONAL,
    pmi-RI-Report-r9 ENUMERATED {setup}      -- Cond PMIRI
    OPTIONAL
}
CQI-ReportPeriodic ::= CHOICE {
    release NULL,
    setup SEQUENCE {
        cqi-PUCCH-ResourceIndex INTEGER (0.. 1185),
        cqi-pmi-ConfigIndex INTEGER (0..1023),
        cqi-FormatIndicatorPeriodic CHOICE {
            widebandCQI NULL,
            subbandCQI SEQUENCE {k INTEGER (1..4)}
        },
        ri-ConfigIndex INTEGER (0..1023)     -- Need OR
        OPTIONAL,
        simultaneousAckNackAndCQI BOOLEAN
    }
}
-- ASN1STOP
```

As used herein, the term "collision" may denote a situation where ACK/NACK and CQI are generated at the same time and/or need to be transmitted at the same time or simultaneously. In case of a collision between the schedules of transmission of ACK/NACK with CQI, three cases are considered in Release-8.

The first case is where CQI is dropped and ACK/NACK is transmitted using the resources (of Format 1a or Format 1b, which may be denoted "Format 1a/1b") allocated for transmission of ACK/NACK.

The second case involves a normal Cyclic Prefix (CP). In this case, ACK/NACK bits are embedded on the reference signals of time-frequency resources allocated for transmission of CQI. The third case involves extended CP. In this case, ACK/NACK bits are jointly encoded with CQI and transmitted on the resources allocated for transmission of CQI.

In Release-10, transmission on multiple carrier components (also referred to as transmission on multiple cells, carrier aggregation, transmission on Primary Cell (PCell) and at least one Secondary Cell (SCell)) is considered for both Uplink (UL) and Downlink (DL) transmissions. As a result, the number of CQI measurements and ACK/NACK bits are greater than that in Release-8 and Release-9. Therefore, Format 2 is no longer sufficient for transmission of CQI (due to the increase in the CQI payload) and in the case of collision in the schedules of CQI and ACK/NACK, ACK/NACK bits may no longer be embedded on the reference signals (as in the second case described above). Thus, new coding, a new transmission format and new resource allocation is needed to address the transmission of CQI bits and collided CQI and ACK/NACK. The notation "CQI+A/N" may be used to indicate collided CQI and ACK/NACK or a collision between the schedules of CQI and ACK/NACK transmission. This notation may not be the notation used by 3GPP.

A brief description of the systems and methods disclosed herein is given as follows. CQI information in Release-10 carrier aggregation mode may be transmitted using Format 3. The assumption may be made that CQI transmission will take place using Format 3 (carrier aggregation mode).

Format 3 resources for transmission of CQI may be semi-statically allocated via higher layer or Radio Resource Control (RRC) signaling. Switching between Format 2 transmission of CQI (for Release 8, LTE) and Format 3 transmission (Release 10, LTE-Advanced) may be done via RRC signaling.

A field may be added to CQI-ReportPeriodic in an RRC Information Element (IE) to indicate the format used for transmission of CQI. In one configuration, such a field may be called CQI-ResourceFormat, which is one bit that may take a value of 0 or 1. A bit value of 0 may indicate a Format 2 transmission and bit value of 1 may indicate Format 3 or vice versa.

A field may be added to CQI-ReportPeriodic in an RRC IE to indicate indices of the cells or carrier components (e.g., primary cell and/or secondary cells, or carrier components) that are going to be reported. In one configuration, the field may be called CQI-ReportedCellIndices. This field is a bit map with the length of the bit map being the same as the number of cells. For example, in Release-10 (LTE-Advanced), the maximum number of cells is five and hence the length of CQI-ReportedCellIndices is five bits. In one configuration, if a bit in CQI-ReportCellIndices has a value of 1, it means that the CQI of the corresponding cell must be reported. Alternatively, a value of 0 could be used to indicate that the CQI of the corresponding cell must be reported.

For CQI transmitted using Format 3, one or more of the following channel encoding schemes may be used. It should be noted that "RM" denotes Reed-Muller encoding where the first number in parenthesis denotes a number of encoded bits (or order of the RM encoding) and "A" denotes a number of CQI bits in the following encoding schemes. An RM(32, A) encoding with a circular buffer to increase the number of bits to 48 bits may be used. Alternatively, an RM(48, A) encoding may be used. Alternatively, an RM(64, A) encoding may be used with a puncturing algorithm in order to reduce the number of coded bits to 48 bits. One example of a puncturing algorithm that may be used may comprise a truncation of the last 16 bits. Additionally or alternatively, a convolutional encoder (as defined in 36.212, for example) with rate matching to generate 48 coded bits may be used.

For a low CQI payload, Reed-Muller encoding may be used. For a larger CQI payload, convolutional encoding may be used. Switching between the Reed-Muller encoding and convolutional encoding may be done based on the CQI payload size.

In a first configuration, the CQI payload size may be inferred (implicitly) from a CQI-ReportConfig Information Element (IE) sent via RRC signaling. For example, if the CQI payload is smaller than a threshold, say 11 bits, Reed-Muller encoding may be used. Otherwise, convolutional encoding may be used. It should be noted that the same or a different threshold, acting on the total number of ACK/NACK and CQI bits, may be used for jointly encoding ACK/NACK and CQI in the case of a collision.

In a second configuration, a field may be added to CQI-ReportPeriodic in order to explicitly signal the use of Reed-Muller or convolutional encoding. For example, such a field may be denoted as CQI-Encoder which is one bit. A bit value of 0 may indicate the use of one of Reed-Muller encoding or convolutional encoding and the bit value of 1 may indicate the use of the other encoding.

In another configuration, a hybrid of the two approaches described above (implicit and explicit) is also possible. In order to allow another bit, it may be needed to specify whether an implicit or an explicit method is used. For example, such a bit may be referred to as a separate field in CQI-ReportPeriodic such as CQI-EncodingMode, which takes two values. A bit value of 0 may indicate an implicit approach (the first configuration described above) and a bit value of 1 may indicate the explicit approach (the second configuration described above) or vice versa. Such a bit may be included by extending the size of CQI-Encoder described above to two bits. With two bits, four distinct approaches may be identified. One case, say value 00, may be used to explicitly indicate the use of Reed-Muller encoding. Another combination, say value 11, may be used to explicitly indicate the use of a convolutional encoder. The remaining combinations may indicate an implicit switching scheme.

In the case of collision between the schedules of periodic CQI and ACK/NACK in the carrier aggregation mode, the following approach may be used. If a CQI transmission format is set to be Format 3, the information element simultaneousAckNackAndCQI is set such that it allows the simultaneous transmission of ACK/NACK and CQI and only Primary Cell (PCell) is received (all other SCells are not received), then CQI may be dropped (e.g., not transmitted) and only ACK/NACK is transmitted on the resources allocated for transmission of ACK/NACK.

If ACK/NACK is set to be transmitted using Format 1a or Format 1b with channel selection, the CQI may be dropped and ACK/NACK may be transmitted on the allocated resources for transmission of ACK/NACK (if an extended Cyclic Prefix (CP) is used, for example). Alternatively, in the case of extended Cyclic Prefix (CP), CQI and ACK/NACK may be jointly encoded and transmitted on the resources allocated for transmission of CQI. In the case of normal CP, the number of ACK/NACK bits may be reduced to fewer bits (e.g., two bits) using bundling techniques such as spatial bundling or cross carrier bundling. The ACK/NACK bits may be transmitted by representing the ACK/NACK bits with a Quadrature Phase-Shift Keying (QPSK) symbol that will be embedded on a reference signal of the physical time-frequency grid (Resource Block or RB) allocated for transmission of CQI. This approach may be referred to as Format 3b.

If ACK/NACK is set to be transmitted using Format 3 and if there are only one or two bits of ACK/NACK or ACK/NACK compression or bundling is performed such that the number of ACK/NACK bits are reduced to one or two bits, different approaches may be used depending on whether extended or normal CP is used. If extended CP is used for transmission of CQI, then ACK/NACK bits may be jointly coded with CQI and transmitted on the resources allocated for CQI. If normal CP is used for transmission of CQI and if there is one bit of ACK/NACK, Binary Phase-Shift Keying (BPSK) modulation may be used to represent the ACK/NACK bit and the BPSK symbol is embedded on the reference signal of the physical Resource Block (RB) allocated for transmission of CQI. This approach may be referred to as Format 3a. If normal CP is used for transmission of CQI and if there are two bits of ACK/NACK, QPSK modulation may be used to represent the ACK/NACK bits and the QPSK symbol is embedded on the reference signal of the physical RB allocated for transmission of CQI. This approach may be referred to as Format 3b.

If ACK/NACK is set to be transmitted using Format 3 and if the ACK/NACK bits are not compressed and there are more than two bits of ACK/NACK, then the ACK/NACK bits may be jointly encoded with CQI bits and transmitted using the resource for transmission of ACK/NACK.

One approach for handling a collision between the schedule of periodic CQI and ACK/NACK was described above. Another approach is described as follows. This approach describes an additional resource allocation configuration such that in the case of simultaneous ACK/NACK and CQI, the ACK/NACK and CQI are jointly transmitted on CQI resources.

In the case of collision between the schedules of periodic CQI and ACK/NACK in the carrier aggregation (CA) mode, the following procedure may be used. If a CQI transmission format is set to be Format 3, the information element (IE) simultaneousAckNackAndCQI is set such that it allows the simultaneous transmission of ACK/NACK and CQI and only Primary Cell (PCell) transmission is received (all other SCell transmissions are not received), then the CQI may be dropped and only ACK/NACK is transmitted on the resources allocated for transmission of periodic CQI.

If ACK/NACK and CQI are set to be transmitted using Format 3 and if the total number of ACK/NACK and CQI bits is less or equal to the number of bits that can be transmitted on Format 3, then they may be jointly or separately coded. If ACK/NACK and CQI are set to be transmitted using Format 3 and if the total number of ACK/NACK and CQI bits is greater than the number of bits that can be supported on the Format 3 resource, then some of the CQI bits may be dropped or compressed and the ACK/NACK and remaining CQI bits may be jointly or separately coded and transmitted using Format 3.

The CQI may be compressed or dropped based on the relative importance of CQI. For example, the CQI of higher quality (e.g., higher signal to noise ratio) carriers or cells are prioritized over those of lower quality. In other words, more bits may be allocated to "more important" CQI of better carriers or the "important" CQI portions of the same carrier compared to the CQI of other carriers or less important CQI information of the same carrier.

In the case of collision between periodic CQI and ACK/NACK, the PDCCH resource indication of ACK/NACK (or the ACK/NACK resource indication (ARI)) may be set equal to that of the pre-assigned periodic CQI resource. An "ARI resource" is the resource indicated by ARI. ARI may be carried by the PDCCH and may indicate a PUCCH resource to transmit ACK/NACK.

If the pre-assigned CQI resource and the ARI resource described above have different values, the CQI may be dropped and the ACK/NACK may be transmitted on the ARI resource. It should be noted that this may overwrite the RRC configuration of simultaneousAckNackAndCQI.

If the pre-assigned CQI resource and the ARI resource described above have different values, the PDCCH may be dropped, as this may indicate an incorrect PDCCH detection. If the pre-assigned CQI resource and the ARI resource described above have different values, the ARI resource may be used to indicate whether to compress ACK and/or CQI.

The ARI resource may be reserved for future use when there is an existing periodic CQI resource available for transmission. In the case of CQI and ACK/NACK being transmitted on the CQI resource, the Node B (e.g., eNodeB, base station, etc.) may use multiple hypothesis decoding to correctly decode the ACK/NACK and CQI bits.

More detail regarding the systems and methods disclosed herein is given hereafter. More specifically, the systems and methods disclosed herein may be used for transmission of Channel Quality Indicator (CQI) and scheduling collision resolution between CQI and ACK/NACK transmission. In one configuration, the systems and methods disclosed herein may be used for transmission of CQI using Format 3.

In Release 10 (LTE-Advanced), multiple cells (also referred to as carrier components, serving cells, and primary cell and secondary cell(s), for example) may be utilized for transmission of information in both downlink (DL) and uplink (UL). A UE may be configured to be able to send and receive on multiple cells through Radio Resource Control (RRC) signaling. If a UE is configured to utilize multiple cells, the UE is in a Carrier Aggregation (CA) mode. It should be noted that in some cases, a UE in CA mode may send and receive on only one cell, a Primary Cell. The systems and methods disclosed herein may be applied to those cases when a UE is in CA mode.

The Node B (e.g., eNodeB, eNB, base station, etc.) may perform scheduling and resource allocation for both uplink (UL) and downlink (DL) transmission. One of the parameters that may be used for resource allocation is Channel Quality Indicator (CQI). The Node B (e.g., eNodeB) transmits reference signals to the UE in the downlink. The UE receives the reference signals transmitted by Node B (e.g., eNodeB) and estimates the communication channel. The channel estimate is quantized and represented by an index, which is an integer number and is known as CQI. The CQI is represented by bits and those bits may be sent back to the Node B (e.g., eNodeB).

There are two types of CQI reporting in 3GPP Releases-8, 9 and 10. These are periodic CQI and aperiodic CQI. Periodic CQI may have a semi-static schedule determined by Node B (e.g., eNodeB) that is signaled to the UE via RRC signaling. Aperiodic CQI is an on-demand reporting of channel quality in which the Node B (e.g., eNodeB) sends a request for CQI reporting to the UE via a Physical Downlink Control Channel (PDCCH). The aperiodic CQI reports are transmitted in the Physical Uplink Shared Channel (PUSCH). However, the systems and methods disclosed herein do not focus on aperiodic CQI reporting. Periodic CQI reports are semi-statically scheduled and the resources are semi-statically allocated on the Physical Uplink Control CHannel (PUCCH). The systems and methods disclosed herein may be applied to resource allocation and the transmission format for periodic CQI reports on the PUCCH.

It should be noted that the Node B (e.g., eNodeB, eNB, etc.) may allocate resources for the transmission of ACK/NACK and CQI. The allocated resources may have different formats. For example, ACK/NACK may have a Format 1a or a Format 1b (denoted "Format 1a/1b"), a Format 1a/1b with channel selection or a Format 3. CQI may have Format 2 or Format 3.

It should also be noted that the resource allocated for transmission of ACK/NACK may different from the resource allocated for transmission of CQI. In LTE and LTE-A, only one resource may be used for transmission of control signals such as ACK/NACK and CQI. Among other things, the systems and methods disclosed herein describe which of the resources allocated to ACK/NACK and CQI may be used in the case of a collision.

Some terminology used in 3GPP Release 10 is given hereafter for clarity. A "cell" may be any communication channel that is specified by standardizations or regulatory bodies to be used for International Mobile Telecommunications-Advanced (IMT-Advanced) and all of it or a subset of it may be adopted by 3GPP as licensed bands to be used for communication between a Node B (e.g., eNodeB) and a UE. "Configured cells" are those cells of which the UE is aware and is allowed by Node B (e.g., eNodeB) to transmit or receive information. The UE may receive system information and perform the required measurements on all configured cells. "Activated cells" are those configured cells on which the UE is transmitting and receiving. That is, activated cells are those cells for which the UE monitors the PDCCH and in the case of a downlink transmission, those cells for which the UE decodes a Physical Downlink Shared Channel (PDSCH). "Deactivated cells" are those configured cells that the UE is not monitoring the transmission PDCCH.

In CA mode, the UE may receive information on multiple activated cells in the downlink (DL). In order to efficiently allocate resources on multiple activated cells, the Node B (e.g., eNodeB) may need the information about the channel quality on all or some subset of the configured cells. Therefore, the UE should be able to report multiple CQI values corresponding to different configured cells in the PUCCH. The transmission format used in Release 8 used for reporting CQI is referred to as Format 2. In Release 8, the CQI value of a single cell with a payload size of 1 to 11 bits may be encoded using RM encoder. With a possible larger payload size for reporting CQI in Release 10 and later releases such as Release 11, Format 2 combined with RM encoder is not sufficient for transmission of CQI reports. Therefore, the systems and methods herein described the use of a Format 3 for transmission of CQI reports.

In particular, there are three issues related to use of Format 3 for transmission of CQI. First, a switching mechanism between Format 2 and Format 3 may need to be defined. Second, a list of configured cells whose CQIs are needed to be reported may need to be available at the UE. The third issue involves how the CQI information is going to be encoded.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods. As used herein the term "plurality" may indicate two or more. For example, a plurality of elements refers to two or more elements.

FIG. 1 is a block diagram illustrating one configuration of a User Equipment (UE) 102 in which systems and methods for resource allocation and encoding for Channel Quality Indicator (CQI) and CQI collided with uplink acknowledgment/negative acknowledgment (ACK/NACK) may be implemented. The UE 102 communicates with a Node B 146 using one or more antennas 142a-n. For example, the UE 102 transmits electromagnetic signals to the Node B 146 and receives electromagnetic signals from the Node B 146 using the one or more antennas 142a-n. The Node B 146 communicates with the UE 102 using one or more antennas 184a-n. It should be noted that the Node B 146 may be an evolved Node B (eNB) or other kind of base station in some configurations.

The UE 102 and the Node B 146 may use one or more cells (e.g., carrier components) 144 to communicate with each other. For example, the UE 102 and Node B 146 may use the cells 144 to carry one or more channels (e.g., Physical Uplink Control Channel (PUCCH), Physical Uplink Shared Channel (PUSCH), Physical Downlink Control Channel (PDCCH), etc.) A PUCCH is one example of a control channel pursuant to 3GPP specifications. For instance, the PUCCH may be a DFT-Spread OFDM (e.g., "Format 3") PUCCH in some configurations. Other kinds of channels may be used.

The UE 102 may include a transceiver 132, a decoder 118, an encoder 122 and an operations module 104. The transceiver 132 may include a receiver 134 and a transmitter 138. The receiver 134 may receive signals from the Node B 146 using one or more antennas 142a-n. For example, the receiver 134 may receive and demodulate received signals using a demodulator 136. The transmitter 138 may transmit signals to the Node B 146 using one or more antennas 142a-n. For example, the transmitter 138 may modulate signals using a modulator 140 and transmit the modulated signals.

The receiver 134 may provide a demodulated signal 128 to the decoder 118. The UE 102 may use the decoder 118 to decode signals. The decoder 118 may provide a decoded signal 114 to the operations module. The decoded signal 114 may include different kinds of information. For example, the decoded signal 114 may include control information, payload data, ACK/NACKs, etc.

As illustrated, the decoder 118 may include an ACK/NACK determination module 120. The ACK/NACK determination module 120 may determine whether data was received correctly. For example, the ACK/NACK determination module 120 may determine whether a packet was correctly or erroneously received. For instance, the ACK/NACK determination module 120 may generate an Acknowledgement or "ACK" represented by a '0' bit for each correctly received packet and a Negative Acknowledgement or "NACK" represented by a '1' bit for each incorrectly received packet. Alternatively, an "ACK" may be represented with a '1' bit and a "NACK" may be represented by a '0' bit. Thus, the decoder 118 may generate ACK/NACKs, which may be provided to the operating module 104 (as part of the decoded signal 114, for example), which may be eventually provide to the encoder 122.

The operations module 104 may be a software and/or hardware module used to control UE 102 communications. The operations module 104 may include a format determination module 106, a CQI cell determination module 108, a collision determination module 110 and a CQI determination module 112.

The format determination module 106 may determine a transmission format for the UE 102. For example, the format determination module 106 may determine whether the UE 102 should transmit information to the Node B 146 using Format 2 or Format 3 based on Radio Resource Control (RRC) signaling from the Node B 146.

The CQI determination module 112 may determine one or more Channel Quality Indicators (CQIs). For example, the CQI determination module 112 may determine one or more CQIs corresponding to one or more cells 114. For example, the CQI determination module 112 may determine feedback, such as a Channel Quality Indicator (CQI) using a reference signal (e.g., a Channel State Information Reference Signal (CSI RS)) 179. It should be noted that demodulation may be accomplished based on a Demodulation Reference Signal (DMRS). In some instances, both of these reference signals (CSI RS and DMRS) may refer to the same physical transmitted signal. However, in other instances, these reference signals (CSI RS and DMRS) may be physically separated.

The CQI cell determination module 108 may determine the cells 144 for which to generate and transmit CQIs. For example, the CQI cell determination module 108 receives information from the Node B 146 that indicates one or more cells 114 for each of which a CQI is requested. The CQI cell determination module 108 may use this information to determine for which cells 144 a CQI will be generated and transmitted.

The collision determination module 110 may determine whether or not a collision between the schedules of CQI and ACK/NACK has occurred or will occur. For example, the collision determination module 110 may determine whether CQI and ACK/NACK are scheduled to be transmitted at the same time, whether they are generated at the same time or need to be transmitted at the same time.

The operations module 104 may provide data or information 116 to the encoder 122. For example, the operations module 104 may provide information regarding a format for transmission, CQI cell designations or indices, whether there is a CQI and ACK/NACK collision, one or more CQI(s), one or more ACK/NACKs. Additional information 116 provided to the encoder 122 by the operations module 104 may include compression information and other information based on RRC signaling, for example The encoder 122 may include a CQI encoding module 126, an ACK/NACK encoding module 186 and a joint CQI and ACK/NACK encoding module 124. Each of these modules 126, 186, 124 may be implemented in hardware, software or a combination of both. The CQI encoding module 126 may be used to encode CQI bits into a feedback message. In some cases, for example, only CQI may be encoded and transmitted. The ACK/NACK encoding module 186 may be used to encode ACK/NACK bits into a feedback message. In some cases, for example, only ACK/NACK may be encoded and transmitted. The joint CQI and ACK/NACK encoding module 124 may be used to jointly encode CQI and ACK/NACK. In some cases, for example, both CQI and ACK/NACK may be encoded and transmitted (as a single feedback message, for example).

The encoder 122 may provide information 130 to the transmitter 138. For example, the encoder 122 may provide encoded feedback messages and particular modulation instructions (in some cases). The transmitter 138 may modulate the encoded feedback messages using a modulator 140 and transmit them using one or more antennas 142a-n.

It should be noted that the cells (e.g., a PUCCH) may have limited communication resources or limited resources allocated to the UE 102 for CQIs and ACK/NACKs. Thus, the systems and methods herein may provide a benefit by providing efficient ways to jointly encode CQI and ACK/NACK into a joint CQI and ACK/NACK feedback message when simultaneous transmission of CQI and ACK/NACK is desired or needed.

The Node B 146 may include a transceiver 174, comprising a receiver 176 and a transmitter 180. The Node B 146 may additionally include a decoder 162, an encoder 168 and an operations module 148. The Node B 146 may receive a feedback message using its one or more antennas 184a-n and its receiver 176. The receiver 176 may use the demodulator 178 to demodulate the feedback message. The receiver 176 may provide demodulated information 170 to the decoder 162. The demodulated information 170 may include a feedback message (e.g., encoded feedback message).

The decoder 162 may include a CQI decoding module 166, an ACK/NACK decoding module 188 and a joint CQI and ACK/NACK decoding module 164. The CQI decoding module 166 may be used to decode a CQI feedback message. The ACK/NACK decoding module 188 may be used to decode an ACK/NACK feedback message. The joint CQI and ACK/NACK decoding module 164 may be used to decode and/or interpret a joint CQI and ACK/NACK feedback message received by the Node B 146. The decoder 162 may provide decoded information 158 to the operations module 148. The decoded information 158 may include, for example, decoded ACK/NACK feedback and/or decoded CQI feedback.

The Node B 146 may use the decoded CQI and/or ACK/NACK feedback to perform certain operations. The operations module 148 may include a retransmission module 150 and a resource allocation module 190. The retransmission module 150 may determine which packets to retransmit (if any) based on ACK/NACK feedback. The resource allocation module 190 may be used by the Node B 146 to schedule or allocate communication resources (e.g., cells 144, Resource Blocks (RBs), bandwidth, time slots, frequency channels, spatial channels, etc.) using CQI feedback.

The operations module 148 may also include a Radio Resource Control (RRC) signaling module 152. The RRC signaling module 152 may generate signals used to control communications between the Node B 146 and the UE 102. RRC signaling 152 may be referred to as "higher layer signaling." The RRC signaling module 152 may include a carrier aggregation (CA) mode signaling module 154. Alternatively, the RRC signaling module 152 may include an explicit format signaling module 154. RRC signaling may include one or more other kinds of information, such as a resource indicator or index (e.g., CQI-ReportConfig.CQI-ReportPeriodic.CQI-PUCCH-ResourceIndex) that indicates resources (e.g., Resource Blocks (RBs), etc.) that may be used by the UE 102 to transmit CQI feedback, a format indicator, a CA mode indicator, an explicit encoding indicator, an encoding mode indicator and/or other information, for example.

In one configuration, the CA mode signaling module 154 generates a signal or command that instructs the UE 102 to perform carrier aggregation (CA). For example, the UE 102 may use such a signal to use an aggregate or group of cells 144 (e.g., multiple cells 144) for communications between the UE 102 and the Node B 146. In some configurations, the UE 102 may use the CA mode signal or command to determine whether to use Format 2 or Format 3 for transmissions.

In another configuration, the explicit format signaling module 154 may generate a signal or command that instructs the UE 102 to use a particular format (e.g., Format 2 or Format 3) for transmissions. For example, the UE 102 may receive the explicit format signal or command and use it to determine whether to use Format 2 or Format 3 for transmissions.

The RRC signaling module 152 may also include a CQI cell designation module 156. The CQI cell designation module 156 may generate a signal or information that requests a CQI report corresponding to each of one or more cells 144. For example, the CQI cell designation module 156 may generate a signal or information instructing the UE 102 to generate a CQI report for a first cell 144 and a CQI report for a second cell 144. This may provide a benefit in that the Node B 146 may have the flexibility to request and acquire CQI reports corresponding only to particular cells 144 of interest. Furthermore, this may provide the benefit that the Node B 144 may control the amount of communication resources being used for CQI reporting.

The operations module 148 may provide data 160 to the encoder 168. For example, the data 101 may include packets for retransmission, resource allocation information, CA mode or explicit format information and/or CQI report cell information, etc. The encoder 168 may encode the data 172, which may then be provided to the transmitter 180. The transmitter 180 may modulate the encoded data using the modulator 182. The transmitter 180 may transmit the modulated data to the UE 102 using one or more antennas 184a-n.

Figure 2:
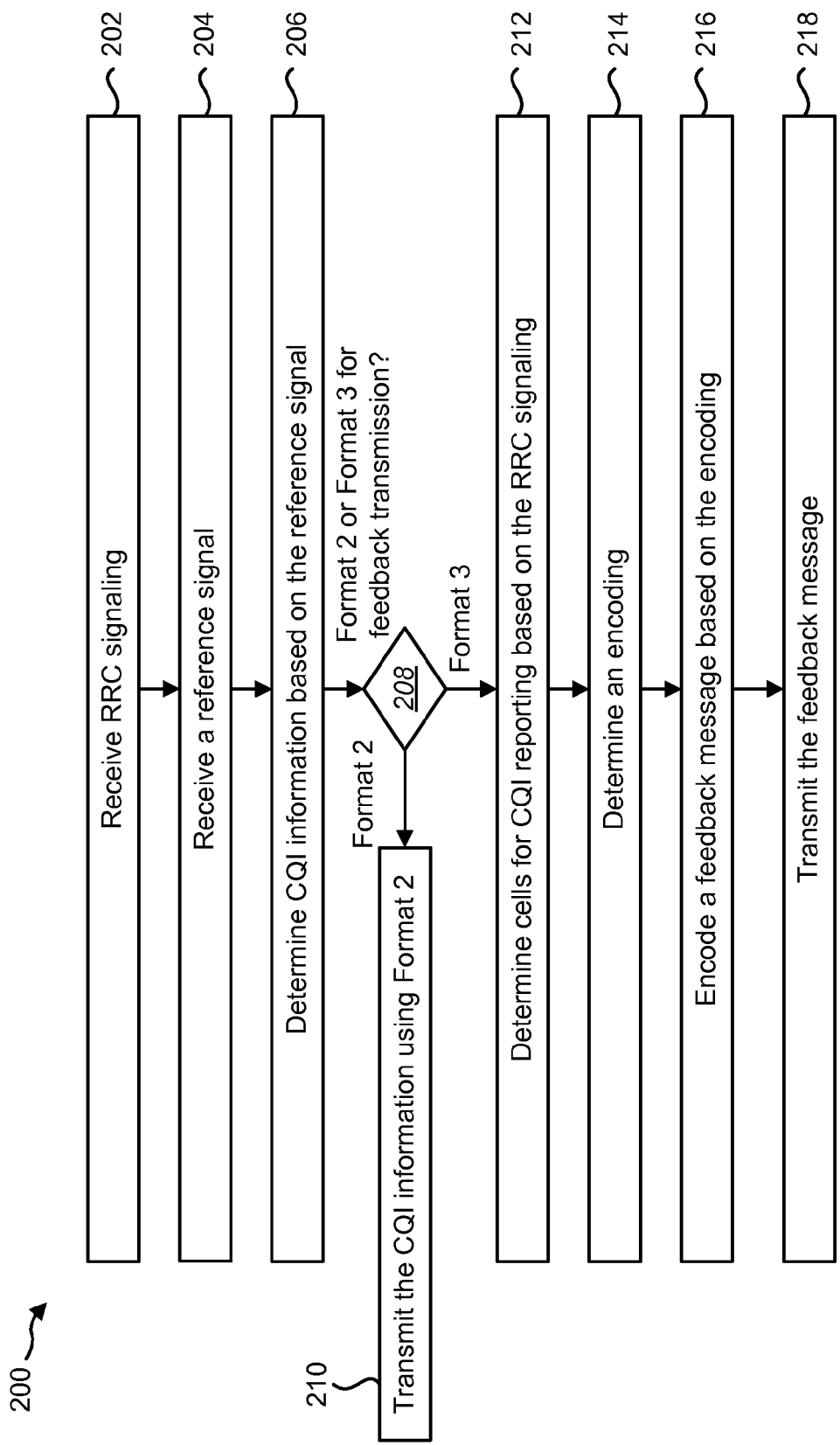
FIG. 2 is a flow diagram illustrating one configuration of a method for resource allocation and encoding feedback.

FIG. 2 is a flow diagram illustrating one configuration of a method 200 for resource allocation and encoding feedback. A UE 102 may receive 202 Radio Resource Control (RRC) signaling. For example, the UE 102 may receive RRC signaling that provides information and/or instructions. The RRC signaling may provide many different types of information/instructions and combinations of different types of information/instructions depending on the configuration. For example, in some configurations, the RRC signaling may instruct the UE 102 to use a carrier aggregation (CA) mode. In other configurations, the RRC signaling may explicitly instruct the UE 102 to use a particular format for feedback transmission. Furthermore, the RRC signaling may request CQI feedback for one or more particular cells 144. Yet other types of information and/or instructions may be provided by the RRC signaling, depending on the configuration (e.g., information/instructions relevant to joint CQI and ACK/NACK encoding).

The UE 102 may receive 204 a reference signal. For example, the UE 102 may receive a reference signal that was generated by and transmitted from the Node B 146. The UE 102 may determine 206 CQI information based on the reference signal 179. For example, the UE 102 receives 204 reference signals 179 transmitted by the Node B (e.g., eNodeB) 146. The UE 102 may then determine 206 the CQI information by estimating the communication channel. The channel estimate is quantized and represented by an index, which is an integer number and is known as CQI or CQI information, which is represented by bits.

The UE 102 may determine 208 whether to use a particular format (e.g., Format 2 or Format 3) for feedback transmission. This determination 208 may depend on the configuration. In one configuration, the received 202 RRC signaling may instruct the UE 102 to use a CA mode, which may be used to determine whether to use Format 2 or Format 3. In another configuration, the received 202 RRC signaling may explicitly instruct the UE 102 to use Format 2 or Format 3, which instruction may be used to make this determination 208. If the UE 102 determines 208 to use Format 2, the UE 102 may transmit 210 the CQI information using Format 2.

If the UE 102 determines 208 to use Format 3, the UE may determine 212 cells for CQI reporting based on the RRC signaling. For example, the received 202 RRC signaling may include information that indicates which cells the UE 102 should generate and transmit CQI reports for. The UE 102 may use this information to make this determination 212.

The UE 102 may determine 214 an encoding. For example, the UE 102 may determine the type of encoding (e.g., Reed-Muller, convolutional, etc.) to use for encoding feedback. Furthermore, the UE 102 may determine 214 whether to encode CQI feedback individually, to encode ACK/NACK individually or to jointly encode CQI and ACK/NACK.

The UE 102 may encode 216 a feedback message based on the encoding. For example, the UE 102 may encode CQI, ACK/NACK or both using Reed-Muller encoding or convolutional encoding. The UE 102 may transmit 218 the feedback message. It should be noted that a feedback message may include only CQI, only ACK/NACK or both.

Figure 3:
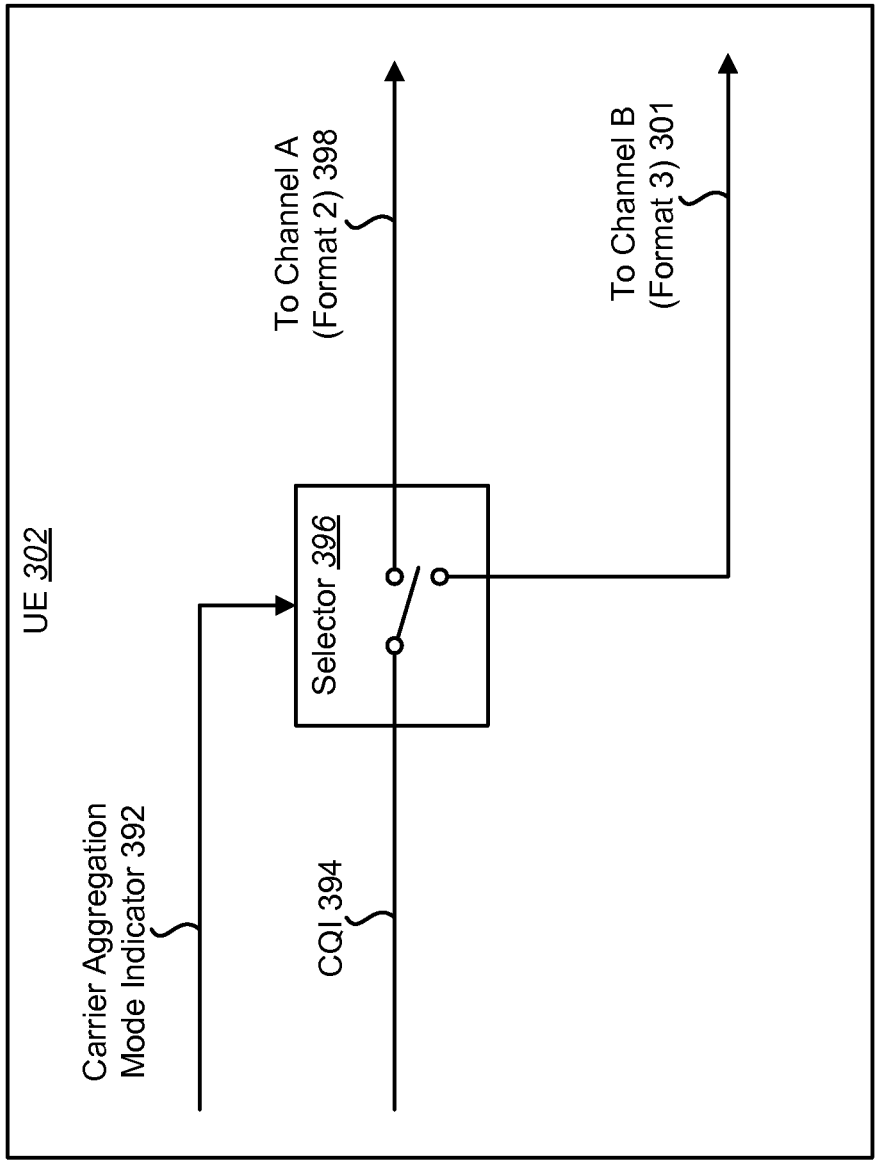
FIG. 3 is a block diagram illustrating one configuration of a User Equipment (UE) for determining a format for transmission according to the systems and methods disclosed herein.

FIG. 3 is a block diagram illustrating one configuration of a User Equipment (UE) 302 for determining a format for transmission according to the systems and methods disclosed herein. The UE 302 may include a selector 396. The UE 302 may use the selector 396 to select channel A (Format 2) 398 for transmission or channel B (Format 3) 301 for transmission. For example, the UE 302 may generate CQI information 394 as described above. The UE 302 may use a carrier aggregation (CA) mode indicator 392 to determine whether to use channel A (Format 2) 398 or channel B (Format 3) 301.

More specifically, the UE 102 may use the selector 396 as a switching mechanism between Format 2 and Format 3. If the UE 302 is in CA mode (which is signaled via RRC signaling), then UE 302 uses Format 3 301. Otherwise, the UE 302 uses Format 2 398. The benefit of this approach is that it does not require the addition of extra bits to signal the switching between the two formats. In other words, FIG. 3 illustrates an approach for implicit switching between Format 2 and Format 3 for transmission of CQI.

Figure 4:
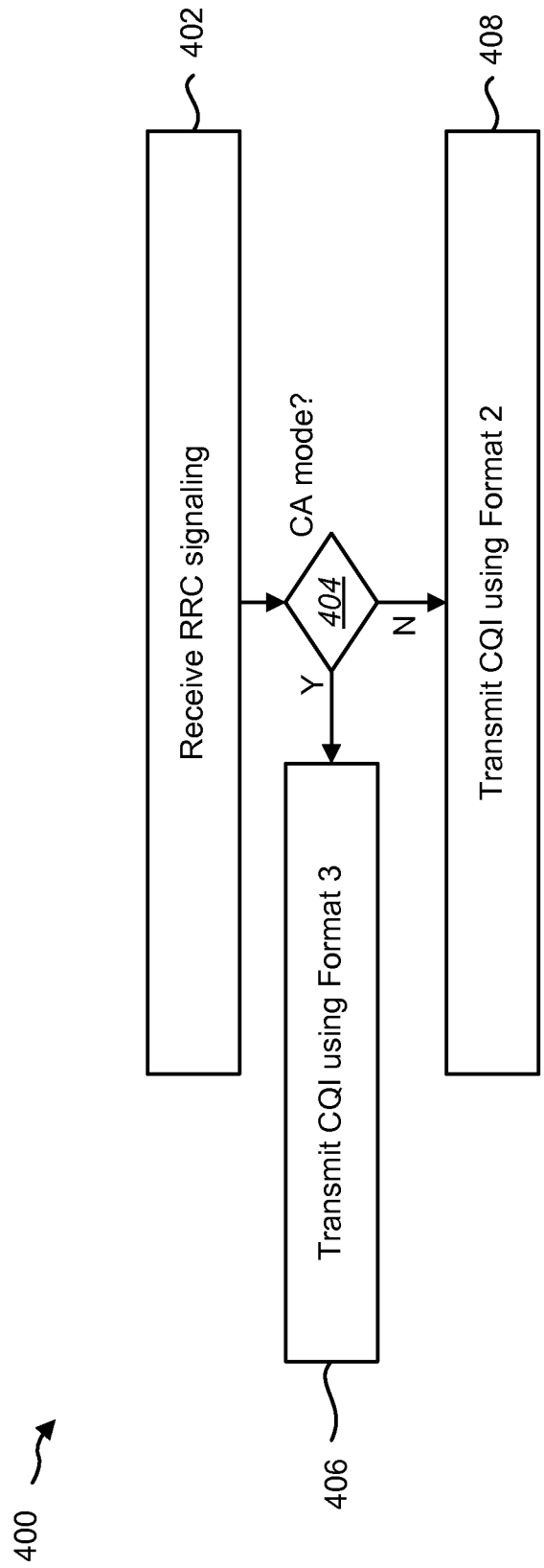
FIG. 4 is a flow diagram illustrating one configuration of a method for implicitly switching between Format 2 and Format 3 for transmission of CQI.

FIG. 4 is a flow diagram illustrating one configuration of a method 400 for implicitly switching between Format 2 and Format 3 for transmission of CQI. A UE 302 may receive 402 RRC signaling. The UE 302 may determine 404 whether it 302 is operating or will operate in carrier aggregation (CA) mode. Whether the UE 302 operates in CA mode may be determined based on the RRC signaling. If the UE 302 is operating or will operate in CA mode, the UE 302 may transmit 406 CQI using Format 3. However, if the UE 302 is not operating in CA mode, then it 302 may transmit 408 CQI using Format 2.

Figure 5:
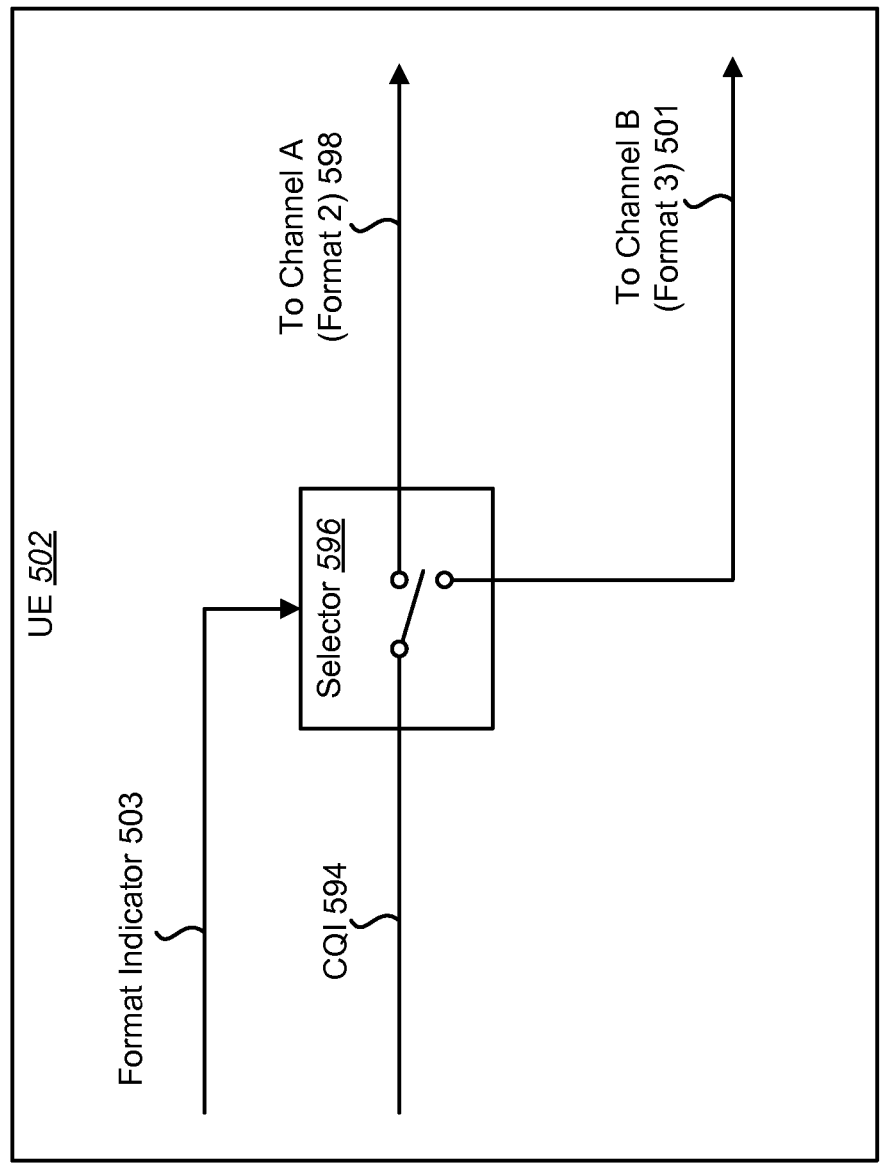
FIG. 5 is a block diagram illustrating one configuration of a User Equipment (UE) for determining a format for transmission according to the systems and methods disclosed herein.

FIG. 5 is a block diagram illustrating one configuration of a User Equipment (UE) 502 for determining a format for transmission according to the systems and methods disclosed herein. The UE 502 may include a selector 596. The UE 502 may use the selector 596 to select channel A (Format 2) 598 for transmission or channel B (Format 3) 501 for transmission. For example, the UE 502 may generate CQI information 594 as described above. The UE 502 may use an explicit format indicator 503 to determine whether to use channel A (Format 2) 598 or channel B (Format 3) 501.

For example, in this approach, a Node B 146 may explicitly signal the switching between Format 2 598 and Format 3 501. For instance, explicit switching between the two formats requires addition of a new (format indicator 503) field to CQI-ReportPeriodic to signal the switching. Such a field may be denoted as CQI-ResourceFormat, which takes two values. For example, if CQI-ResourceFormat has a value of 1, it indicates Format 3; if its value is 0, it indicates Format 2. Alternatively, a value of 0 may indicate Format 3 and a value of 1 may indicate Format 2. The benefit of the explicit switching is that the Node B 146 (e.g., eNodeB) has more flexibility for scheduling UEs 102. It should be noted that with explicit switching, Format 2 may be used in combination with CA mode. In summary, FIG. 5 illustrates explicit switching between Format 2 and Format 3. As noted above, a new parameter (e.g., format indicator 503) is introduced in this disclosure. For example, the UE 502 may interpret CQI-ResourceFormat=1 as "use Format 3 for transmission of CQI."

Figure 6:
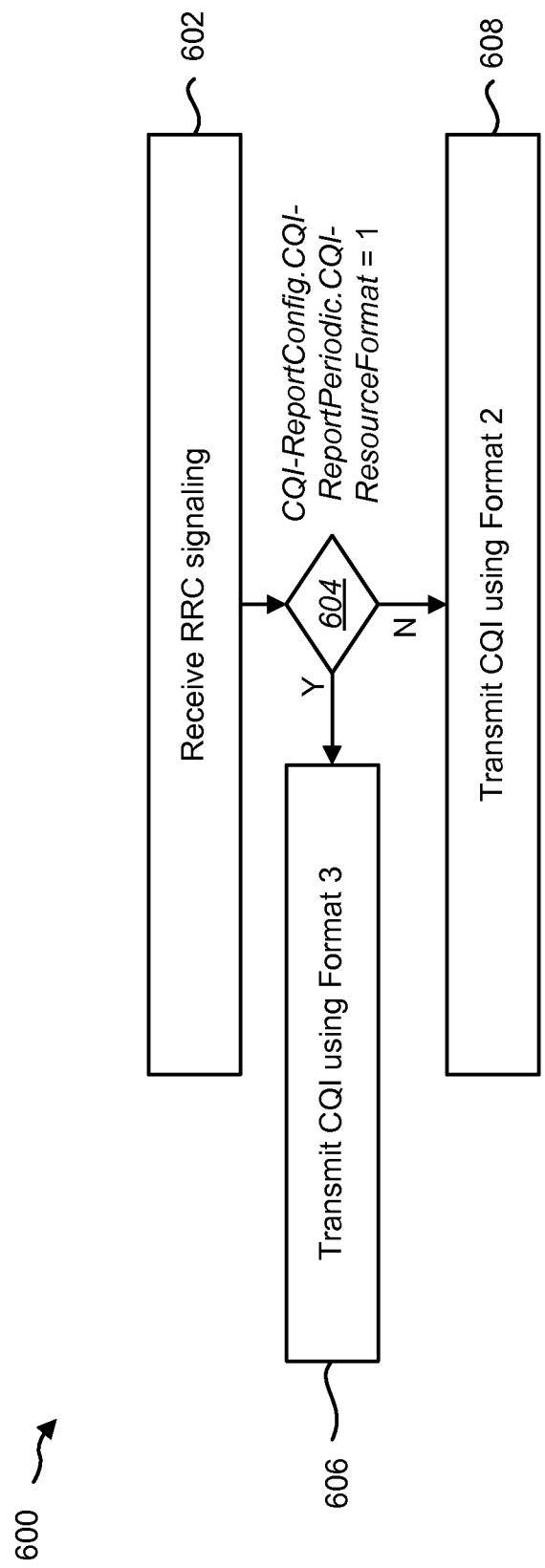
FIG. 6 is a flow diagram illustrating one configuration of a method for explicitly switching between Format 2 and Format 3 for transmission of CQI.

FIG. 6 is a flow diagram illustrating one configuration of a method 600 for explicitly switching between Format 2 and Format 3 for transmission of CQI. A UE 502 may receive 602 RRC signaling. The RRC signaling may include a format indicator 503 (e.g., CQI-ResourceFormat or CQI-ReportConfig.CQI-ReportPeriodic.CQI-ResourceFormat). The UE 502 may determine 604 whether to use Format 2 or Format 3 for CQI transmission. For example, the UE 502 may determine whether a format indicator 503 indicates Format 2 or 3. For instance, if CQI-ReportConfig.CQI-ReportPeriodic.CQI-ResourceFormat=1, the UE 502 may transmit 606 CQI using Format 3. However, if CQI-ReportConfig.CQI-Report-Periodic.CQI-ResourceFormat=0, the UE 502 may transmit 608 CQI using Format 2.

Figure 7:
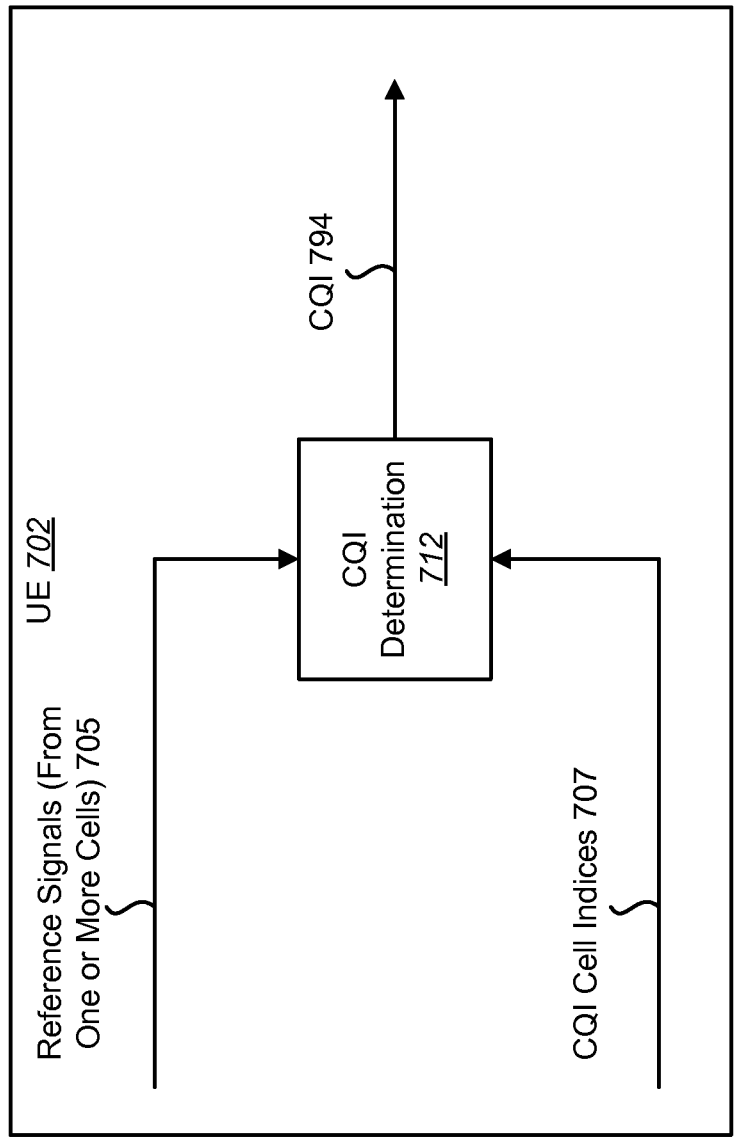
FIG. 7 is a block diagram illustrating one configuration of a User Equipment (UE) for determining one or more Channel Quality Indicators (CQIs) for one or more cells.

FIG. 7 is a block diagram illustrating one configuration of a User Equipment (UE) 702 for determining one or more Channel Quality Indicators (CQIs) for one or more cells 144. For example, a UE 702 may receive one or more reference signals 705 and CQI cell indices 707. The Node B 146 may send the one or more reference signals 705 to the UE 702. The reference signals 705 may be from or correspond to one or more cells 144. In one configuration, the UE 702 may receive one or more reference signals 705, each of which may be used for multiple functionalities or different functionalities. For example, one set of reference signals 705 may be used for a Channel State Measurement (CSI) (which may be used for measurement of CQI, Rank Indicator (RI) and Precoding Matrix Indicator (PMI)) and they 705 may also be used for demodulation. The UE 702 may also receive CQI cell indices 707. For example, the CQI cell indices 707 may be received as part of RRC signaling. The CQI cell indices 707 may indicate one or more cells 144 for which the UE 702 may generate and transmit a CQI 794.

The UE 702 may include a CQI determination module 712. The CQI determination module 712 may use the reference signals 705 and the CQI cell indices 707 to determine one or more CQIs 794. For example, the CQI determination module 712 may use the reference signals 705 to generate an integer value that is converted to bits (e.g., CQIs 794) for each of the cells 144 indicated by the CQI cell indices 707.

More specifically, the CQI cell indices 707 may indicate which CQIs are to be reported by the UE 702. In one configuration, a field is needed to be added to CQI-ReportPeriodic to indicate the indices of the cells 144 (e.g., primary cell and/or secondary cells, or carrier components) that are going to be reported. The field may be called CQI-ReportedCellIndices. Such a field may be a bit map where the length of the bit map is the same as the number of configured cells.

For example, in Release 10 (LTE-Advanced) the maximum number of configured cells is five. Hence, the length of CQI-ReportedCellIndices is five bits. In one configuration, if a bit in CQI-ReportCellIndices has value of 1 it means that the CQI of the corresponding cell 144 must be reported. Alternatively, a value of 0 may mean that the CQI of the corresponding cell 144 must be reported. Having the CQI-ReportCellIndices field provides the benefit of enabling the Node B (e.g., eNodeB) 146 to control the amount of CQI reporting in the uplink and increases Node B (e.g., eNodeB) 146 capability in controlling the amount of overhead in the PUCCH.

Figure 8:
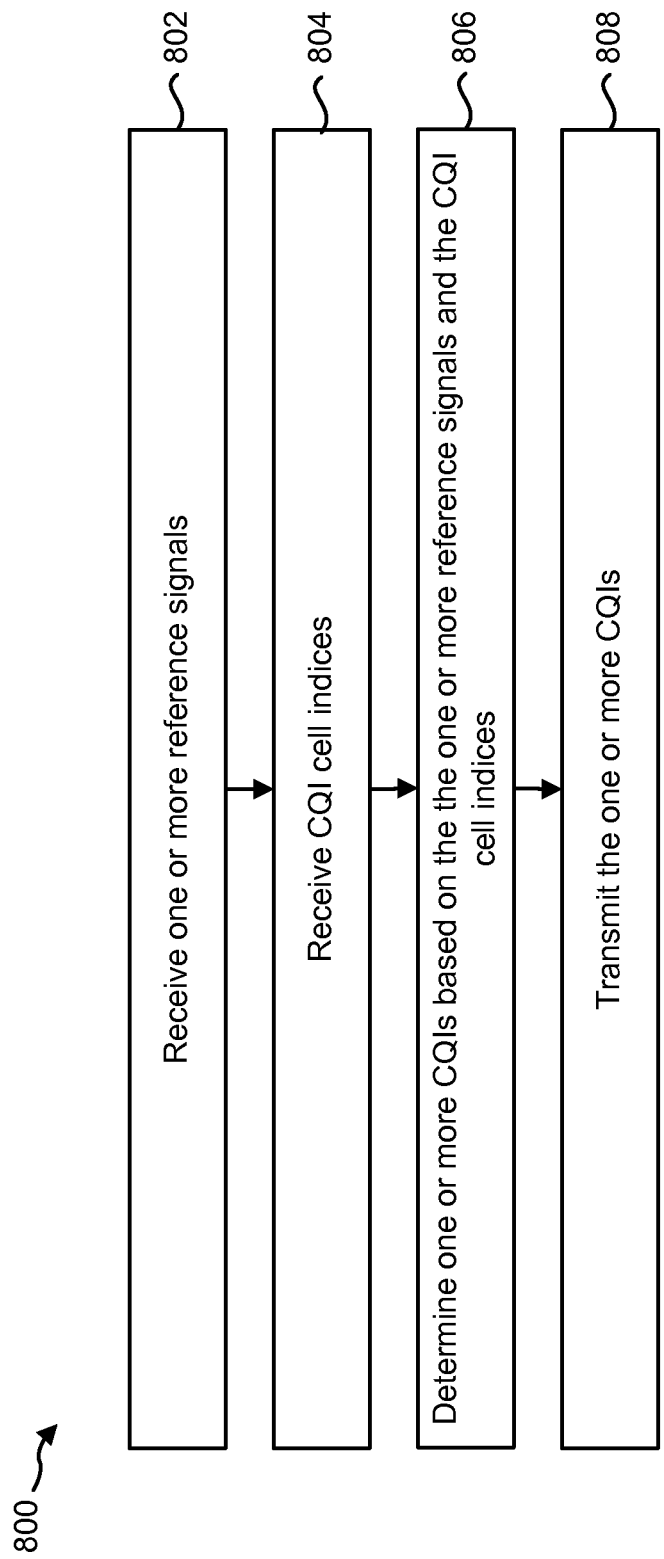
FIG. 8 is a flow diagram illustrating one configuration of a method for determining one or more Channel Quality Indicators (CQIs) for one or more cells.

FIG. 8 is a flow diagram illustrating one configuration of a method 800 for determining one or more Channel Quality Indicators (CQIs) for one or more cells 144. For example, a UE 702 may receive 802 one or more reference signals 705. The reference signals 705 may be from or correspond to one or more cells 144. In one configuration, the UE 702 may receive one or more reference signals 705, each of which may be used for multiple functionalities or different functionalities. For example, one set of reference signals 705 may be used for a Channel State Measurement (CSI) (which may be used for measurement of CQI, Rank Indicator (RI) and Precoding Matrix Indicator (PMI)) and they 705 may also be used for demodulation. The UE 702 may receive 804 CQI cell indices 707. The Node B 146 may send the one or more reference signals 705 and the CQI cell indices 707 (as part of RRC signaling) to the UE 702. The CQI cell indices 707 may indicate one or more cells 144 for which the UE 702 may generate and transmit a CQI 794.

The UE 702 may determine 806 one or more CQIs 794 based on the one or more reference signals 705 and the CQI cell indices 707. For example, the CQI determination module 712 may use the reference signals 705 and the CQI cell indices 707 to determine one or more CQIs 794. More specifically, the CQI determination module 712 may use the reference signals 705 to generate an integer value that is converted to bits (e.g., CQIs 794) for each of the cells 144 indicated by the CQI cell indices 707. As mentioned above, a field CQI-ReportedCellIndices may comprise the cell indices 707. The UE 702 may transmit 808 the one or more CQIs 794.

Figure 9:
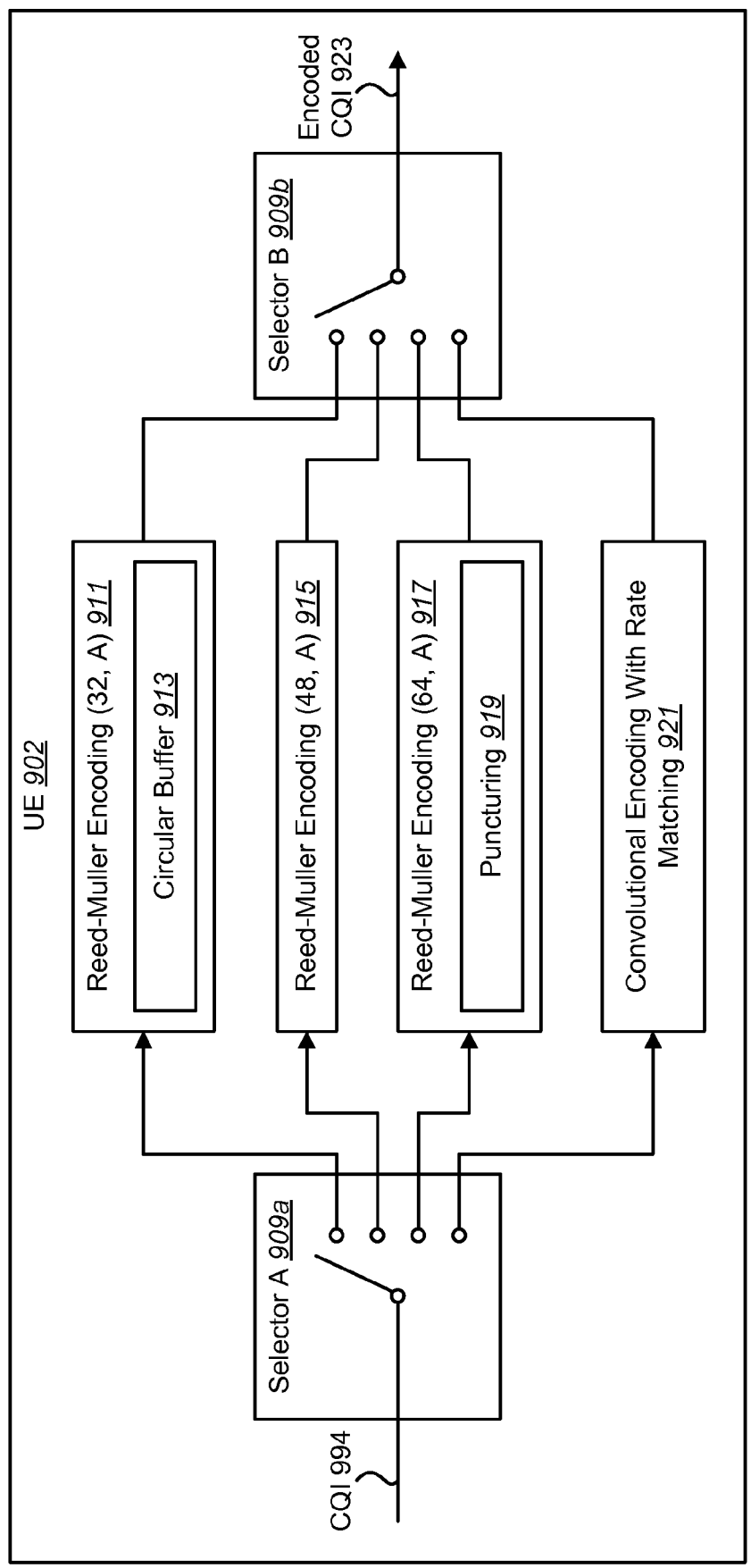
FIG. 9 is a block diagram illustrating several encodings that may be used in accordance with the systems and methods disclosed herein.

FIG. 9 is a block diagram illustrating several encodings that may be used in accordance with the systems and methods disclosed herein. In other words, FIG. 9 illustrates several encoding mechanisms that may be used to encode feedback (e.g., CaI). For example, for CQI transmitted using Format 3, the following channel coding schemes may be used. It should be noted that "A" denotes the total number of encoded CQI bits (to be transmitted, for example) input into an encoder.

In one configuration, a Reed-Muller (RM) encoding 911 with 'A' input uncoded CQI bits 994 and 32 encoded CQI bits (denoted by RM(32, A)) may be used. This Reed-Muller encoding 911 may also use a circular buffer 913 to increase the number of (encoded) bits 923 to 48 bits. For example, the circular buffer 913 may repeat parity bits. For instance, the circular buffer 913 may repeat the first 16 (of 32) encoded bits such that the total number of encoded CQI bits 923 is 48.

In another configuration, a Reed-Muller (RM(48, A)) encoding 915 may be used. The RM(48, A) encoder 915 may generate 48 encoded CQI bits 923. In another configuration, a Reed-Muller encoding (RM(64, A)) 917 may be used along with a puncturing module or algorithm 919 to reduce the number of encoded CQI bits 923 to 48 bits. In yet another configuration, a convolutional encoding with rate matching 921 (e.g., as defined in 36.212) may be used to generate 48 encoded CQI bits 923.

Reed-Muller encoding has a reasonably good performance at low payload size with a low complexity for encoding and decoding algorithms. Convolutional encoding has a good performance as the payload size increases. Each of the above schemes (e.g., encodings 911, 915, 917, 921) may be used as the sole encoding mechanism for encoding the CQI bits. Alternatively, a hybrid method may be used. If a hybrid method is used, then a switching mechanism may be used in order to change the encoding scheme. For example, selector A 909a and selector B 909b may be used to switch between encodings 911, 915, 917, 921. The switching may be implemented in several ways as described below.

Figure 10:
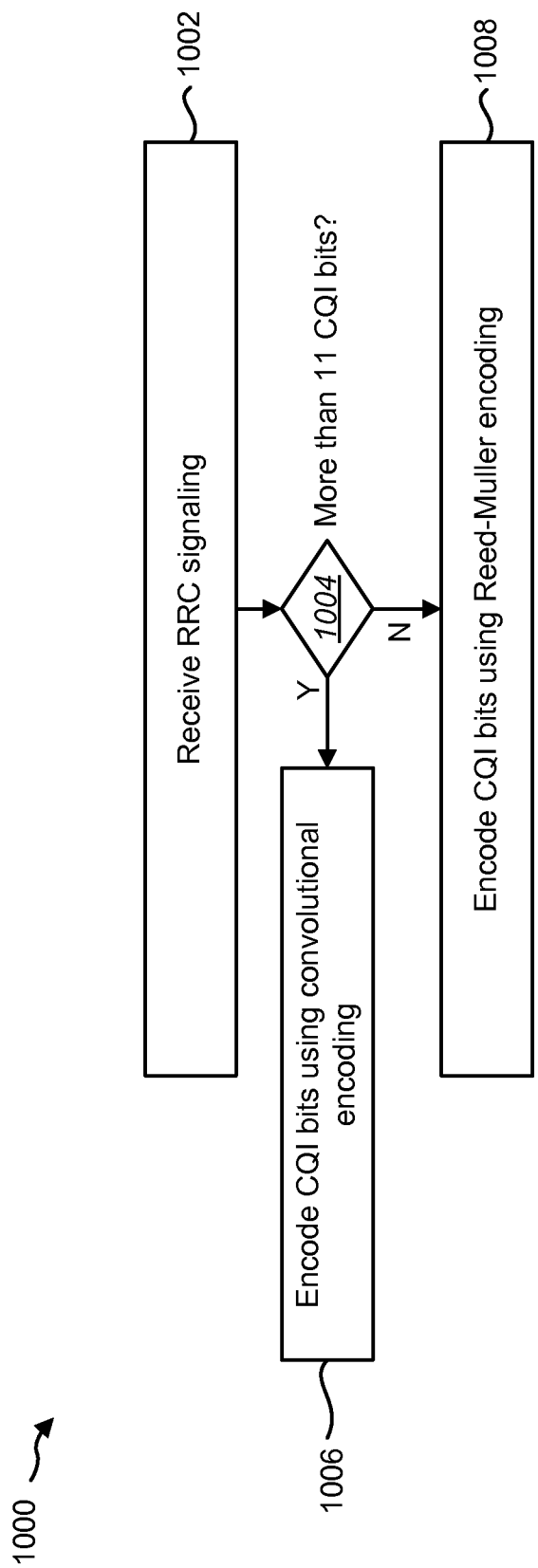
FIG. 10 is a flow diagram illustrating one configuration of a method for implicitly switching encodings.

FIG. 10 is a flow diagram illustrating one configuration of a method 1000 for implicitly switching encodings. A UE 902 may receive 1002 RRC signaling. In one configuration, the RRC signaling may indicate a number of CQI bits 994 to be encoded. The UE 902 may determine 1004 whether there are more that a designated or threshold number of CQI bits 994. For example, if there is more than the threshold number of 11 CQI bits, then the UE 902 may encode 1006 the CQI bits 994 using a convolutional encoding 921. If there are the threshold number (e.g., 11) or fewer CQI bits 994, the UE 902 may encode 1008 the CQI bits 994 using Reed-Muller encoding (e.g., one of RM(32, A) 911, RM(48, A) 915 or RM(64, A) 917). It should be noted that the threshold number may be determined based on a performance requirement of the CQI bits. As illustrated, the threshold number may be 11 for LTE-A.

More specifically, the switching between the Reed-Muller encoding and the convolutional encoding may be done implicitly based on the CQI payload. For example, if the CQI 994 payload is less than 11 bits, Reed-Muller encoding 911, 915, 917 is used. Otherwise, convolutional encoding 921 is used. In summary, FIG. 10 illustrates implicit switching between Reed-Muller and convolutional encoding.

Figure 11:
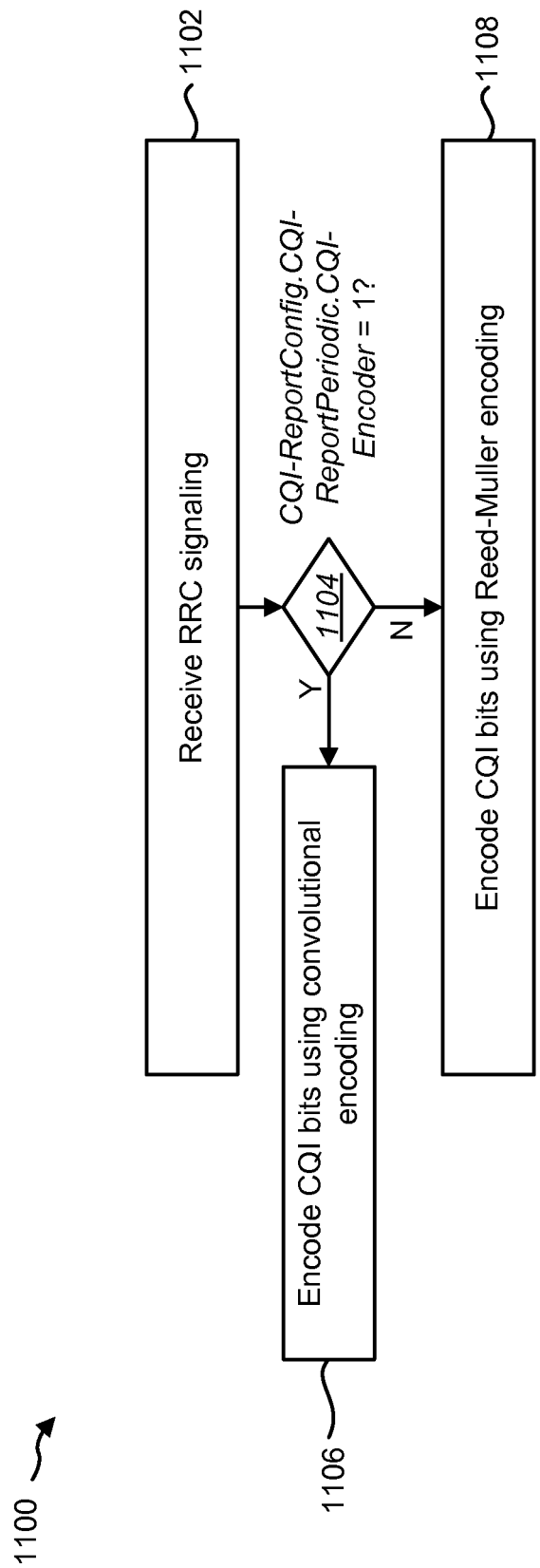
FIG. 11 is a flow diagram illustrating one configuration of a method for explicitly switching encodings.

FIG. 11 is a flow diagram illustrating one configuration of a method 1100 for explicitly switching encodings. A UE 902 may receive 1102 RRC signaling. In one configuration, the RRC signaling may include an explicit encoding indicator or field that explicitly indicates a particular encoding. For example, this indicator or field may be denoted CQI-Report-Config.CQI-ReportPeriodic.CQI-Encoder. The UE 902 may determine 1104 whether the encoding field is equal to a value of 1 (or 0 in another configuration). For example, the UE 902 may determine 1104 whether CQI-ReportConfig.CQI-ReportPeriodic.CQI-Encoder=1. If the encoding field is equal to a value of 1, then the UE 902 may encode 1106 the CQI bits 994 using a convolutional encoding 921. If the encoding field is not equal to a value of 1 (e.g., 0), then the UE 902 may encode 1108 the CQI bits 994 using Reed-Muller encoding (e.g., one of RM(32, A) 911, RM(48, A) 915 or RM(64, A) 917).

More specifically, the switching between Reed-Muller encoding and the convolutional encoding may be done explicitly. In one configuration, explicit switching between encodings may require the addition of another field, CQI-Encoder, to CQI-ReportPeriodic in the RRC in order to determine the encoding scheme. A value of 0 of CQI-Encoder may indicate the use of Reed-Muller encoding 911, 915, 917 and value of 1 of CQI-Encoder may indicate the use of convolutional encoding, or vice versa. For example, the UE 902 may interpret CQI-Encoder=1 as "convolutional encoding." In summary, FIG. 11 illustrates explicit switching between Reed-Muller and convolutional encoding.

Figure 12:
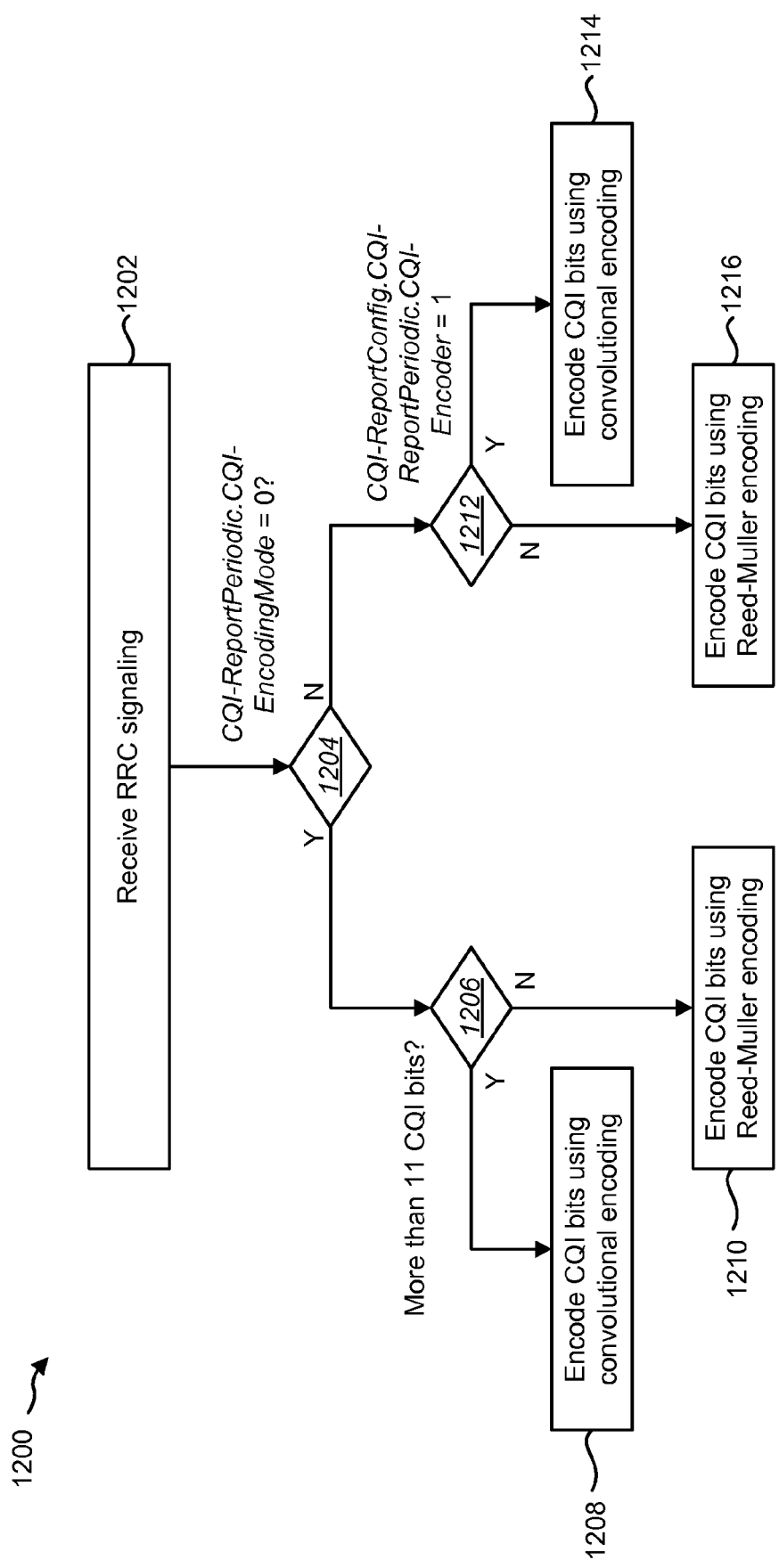
FIG. 12 is a flow diagram illustrating one configuration of a method for switching encodings.

FIG. 12 is a flow diagram illustrating one configuration of a method 1200 for switching encodings. A UE 902 may receive 1202 RRC signaling. In one configuration, the RRC signaling may include an (explicit) encoding mode indicator or field that indicates a particular encoding mode. For example, the encoding mode indicator or field may be denoted CQI-ReportPeriodic.CQI-EncodingMode. The UE 902 may determine 1204 whether the encoding mode field (e.g., CQI-ReportPeriodic.CQI-EncodingMode) is equal to a value of 0.

If the encoding mode field is equal to a value of 0, the UE 902 may determine 1206 whether there are more than a designated number (e.g., 11) of CQI bits 994. For example, if there are more than 11 CQI bits, then the UE 902 may encode 1208 the CQI bits 994 using convolutional encoding 921. If there are 11 or fewer CQI bits 994, the UE 902 may encode 1210 the CQI bits 994 using Reed-Muller encoding (e.g., one of RM(32, A) 911, RM(48, A) 915 or RM(64, A) 917).

If the encoding mode field is not equal to a value of 0 (e.g., it is equal to a value of 1), then the UE 902 may determine 1212 whether an encoding field is equal to a value of 1. In one configuration, for example, the RRC signaling may include an encoding field that explicitly indicates a particular encoding. For example, this field may be denoted CQI-ReportConfig.CQI-ReportPeriodic.CQI-Encoder. The UE 902 may determine 1212 whether the encoding field is equal to a value of 1 (or 0 in another configuration). For example, the UE 902 may determine 1212 whether CQI-ReportConfig.CQI-ReportPeriodic.CQI-Encoder=1. If the encoding field is equal to a value of 1, then the UE 902 may encode 1214 the CQI bits 994 using convolutional encoding 921. If the encoding field is not equal to a value of 1 (e.g., 0), then the UE 902 may encode 1216 the CQI bits 994 using Reed-Muller encoding (e.g., one of RM(32, A) 911, RM(48, A) 915 or RM(64, A) 917).

More specifically, FIG. 12 illustrates a hybrid of implicit and explicit switching. In order to allow hybrid switching, another bit may be needed to specify whether an implicit or an explicit approach is used. Such a bit may be denoted by a separate field in CQI-ReportPeriodic such as CQI-EncodingMode, which takes two values. A value of 0 may indicate an implicit approach and a value of 1 may indicate an explicit approach or vice versa. Such a bit may be included by extending the size of CQI-Encoder defined above to two bits. With two bits, four distinct combinations may be identified. One combination, say value 00, may be used to explicitly indicate the use of Reed-Muller encoding. Another combination, say value 11, may be used to explicitly indicate the use of convolutional encoding. The remaining combinations may indicate an implicit switching scheme. In summary, FIG. 12 illustrates a hybrid of implicit and explicit switching between Reed-Muller and convolutional encoding using separate RRC signaling (e.g., CQI-EncodingMode) information element (IE).

Figure 13:
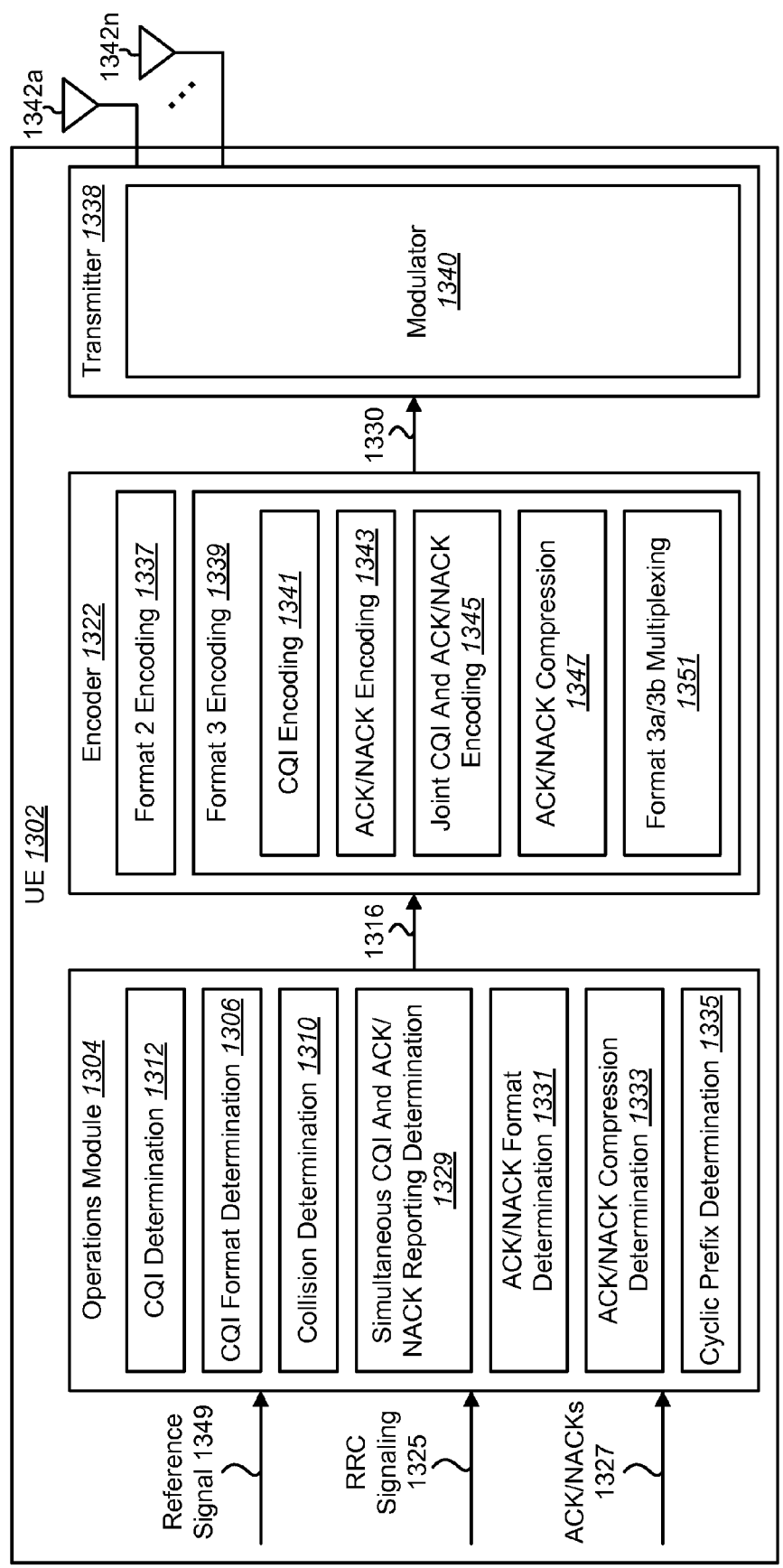
FIG. 13 is a block diagram illustrating one configuration of a UE configured for encoding Channel Quality Indicator (CQI) and/or Acknowledgment/Negative Acknowledgment (ACK/NACK)

FIG. 13 is a block diagram illustrating one configuration of a UE 1302 configured for encoding Channel Quality Indicator (CQI) and/or Acknowledgment/Negative Acknowledgment (ACK/NACK). The UE 1302 may include an operations module 1304, an encoder 1322, a transmitter 1338 and one or more antennas 1342a-n.

The operations module 1304 may be a module used for controlling communications between the UE 1302 and a Node B 146. The operations module 1304 may include a CQI determination module 1312, a CQI format determination module 1306, a collision determination module 1310, a simultaneous CQI and ACK/NACK reporting determination module 1329, an ACK/NACK format determination module 1331, an ACK/NACK compression determination module 1333 and a cyclic prefix determination module 1335.

The CQI determination module 1312 may determine one or more CQIs. For example, the CQI determination module 1312 may use one or more reference signals 1349 to determine one or more CQIs. For instance, the UE 1302 receives the reference signals 1349 transmitted by the Node B 146 (e.g., eNodeB) and estimates the communication channel. The channel estimate is quantized and represented by an index, which is an integer number and is known as CQI. The CQI may be represented by bits.

The CQI format determination module 1306 may determine whether Format 2 or Format 3 is to be used for CQI transmission. This CQI format determination module 1306 may determine the format implicitly or explicitly. For example, the CQI format determination module 1306 may determine the format for transmission similar to the procedures described in connection with FIGS. 3-6 above. For instance, the CQI format determination module 1306 may use RRC signaling 1325 (e.g., whether the UE is in CA mode or the format is explicitly indicated) to make this determination.

The collision determination module 1310 may determine whether a collision in schedules between CQI and ACK/NACK has or will occur. For example, CQI and ACK/NACK may be generated simultaneously and/or may need to be transmitted simultaneously, denoting a "collision." The collision determination module 1310 may determine when this occurs. For example, the collision determination module 1310 may use ACK/NACKs 1327 (or scheduling information for ACK/NACKs) and CQIs or scheduling information about CQIs to make this determination.

The simultaneous CQI and ACK/NACK reporting determination module 1329 may determine whether simultaneous (e.g., joint) reporting of CQI and ACK/NACK is permitted. For example, the simultaneous CQI and ACK/NACK reporting determination module 1329 may receive information as part of RRC signaling 1325 that indicates whether simultaneous (e.g., joint) CQI and ACK/NACK reporting is permitted or otherwise instructed. It 1329 may use this information to make a simultaneous (e.g., joint) reporting determination.

The ACK/NACK format determination module 1331 may determine whether Format 1a/1b with channel selection or Format 3 is to be used for ACK/NACK reporting or transmission. More specifically, ACK/NACK transmission may take one of two formats: Format 1a/1b with channel selection or Format 3. In one configuration, the ACK/NACK format determination module 1331 may make this determination as follows. If there are more than four bits of ACK/NACK, the transmission may be done based on Format 3. However, if there are less than or equal to four bits of ACK/NACK, transmission may be done using either format (e.g., Format 1a/1b or Format 3). When there are less than or equal to four bits of ACK/NACK available, RRC signaling may be used in order to determine the format. For example, the format may be determined by the Node B 146 (e.g., eNodeB, base station, etc.), and it is implicitly conveyed to the UE 1302 via downlink control information indicating how the ACK/NACK information is to be conveyed if the UE 1302 can be configured to send more than four bits of ACK/NACK. However, the UE 1302 may only be configured to send four bits or less by the Node B (e.g., eNodeB, etc.) 146.

The ACK/NACK compression determination module 1333 may determine whether a number of ACK/NACK bits are to be compressed (to 1 or 2 bits, for example) using spatial bundling or cross-carrier bundling, for example. This determination may be based on some indication by the Node B 146 (e.g., eNodeB), being either explicitly or implicitly signaled. For example, in one configuration, this determination may be made based on RRC signaling. In another configuration, this determination may be made based on a subframe condition, such as the existence of a collision or the payload size of a Physical Uplink Control Channel (PUCCH). In yet another configuration, this determination may be made based on a combination of RRC signaling and the subframe condition.

The Cyclic Prefix (CP) determination module 1335 may determine whether a normal or extended CP is to be used. For example, this may be detected by the UE 1302 based on received downlink physical (PHY) signals, which may use an extended CP for its downlink. In particular, the UE 1302 may make this determination from detection of a Broadcast Channel at the physical layer. Once the UE 1302 detects usage of normal or extended CP, it may be used when the UE is attached to that cell 144 until it is no longer attached. In another configuration, this determination may be made based on RRC signaling. For instance, the length of the CP (whether normal or extended, for example), may be determined by a Secondary Synchronization Signal. In one instance, the CP may be static and may be detected using the Secondary Synchronization Signal and RRC signaling (e.g., System Information Block (SIB)).

The operations module 1304 may provide information 1316 to the encoder 1322. The information 1316 provided to the encoder may include many different kinds of information and/or combinations of different kinds of information. For example, the information may include one or more of the following: one or more CQIs, one or more ACK/NACKs, a CQI format indicator, a collision indicator, a simultaneous CQI and ACK/NACK reporting indicator, an ACK/NACK format indicator, an ACK/NACK compression indicator a CP indicator and a Format 3 resource specification.

The encoder 1322 may include a Format 2 encoding module 1337 and a Format 3 encoding module 1339. The Format 3 encoding module 1339 may include a CQI encoding module 1341, an ACK/NACK encoding module 1343, a joint CQI and ACK/NACK encoding module 1345, an ACK/NACK compression module 1347 and a Format 3a/3b multiplexing module 1351.

The encoder 1322 may use information 1316 (e.g., a CQI format indicator) provided by the operations module to determine whether to encode feedback (e.g., CQI) using Format 2 encoding 1337 or Format 3 encoding. The encoder 1322 may use other information 1316 to determine whether to use CQI encoding 1341, ACK/NACK encoding 1343 or joint CQI and ACK/NACK encoding 1345. For example, the encoder 1322 may use one or both of a collision indicator and a simultaneous CQI and ACK/NACK reporting indicator to make this determination.

The encoder 1322 may also use information 1316 (or some of the information 1316) to determine whether to use ACK/NACK compression 1347, such as an ACK/NACK compression indicator and/or an ACK/NACK format indicator. The information 1316 (or some of the information 1316) may also be used to determine whether to use Format 3a/3b multiplexing 1351. For example, the encoder 1322 may use a CP indicator to determine whether to use Format 3a/3b multiplexing. More detail is given below.

The encoder 1322 may provide information 1330 to the transmitter. For example, the information 1330 may include encoded CQI bits, encoded ACK/NACK bits, jointly encoded CQI and ACK/NACK bits and/or a Format 3a/3b indicator. The transmitter 1338 may include a modulator 1340. The transmitter 1338 may modulate encoded bits using the modulator 1340. The modulator 1340 may also use the Format 3a/3b indicator to modulate ACK/NACK bits for multiplexing onto a reference signal in some cases. The transmitter 1338 may transmit feedback information using one or more antennas 1342*a-n*. For example, the feedback information may be CQI feedback, ACK/NACK feedback, joint CQI or ACK/NACK feedback.

Figure 14:
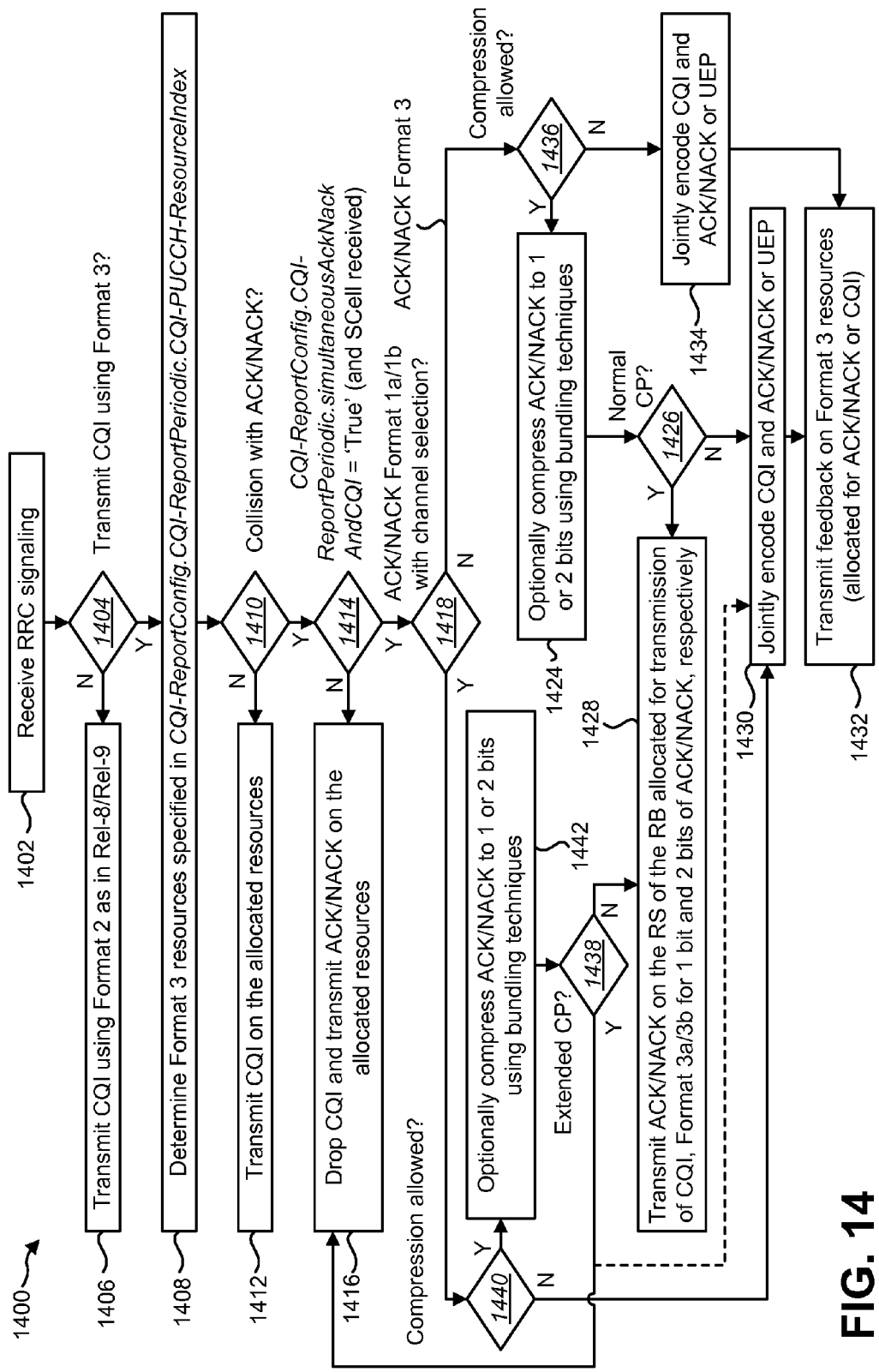
FIG. 14 is a flow diagram illustrating one configuration of a method for encoding feedback.

FIG. 14 is a flow diagram illustrating one configuration of a method 1400 for encoding feedback. A UE 1302 may receive 1402 RRC signaling. For example, the RRC signaling may be generated and transmitted by a Node B 146 to the UE 1302. The UE 1302 may determine 1404 whether to transmit CQI using Format 3. This determination 1404 may be accomplished implicitly or explicitly, similar to that described above in connection with FIGS. 3-6. If the UE 1302 determines 1404 not to transmit CQI using Format 3 (or to transmit CQI using Format 2), then the UE 1302 may transmit 1406 CQI using Format 2. This may be done in accordance with Format 2 transmission as specified by 3GPP Release-8 and Release-9.

If the UE 1302 determines 1404 to transmit CQI using Format 3, the UE 1302 may determine 1408 Format 3 resources specified by a resource indicator or index (e.g., CQI-ReportConfig.CQI-ReportPeriodic.CQI-PUCCH-ResourceIndex). The resource indicator or index may be part of RRC signaling and indicates resources (e.g., Resource Blocks (RBs), etc.) that may be used by the UE 1302 to transmit feedback.

The systems and methods disclosed herein describe scheduling collision resolution between CQI and ACK/NACK. For example, the schedule for transmission of CQI may collide with the schedule for transmission of ACK/NACK in the uplink (UL). For instance, in 3GPP Release-10, although multiple resources may be allocated for transmission of CQI and ACK/NACK, only one resource may be used for transmission of the information. Therefore, either a mechanism may be needed to determine which information (e.g., CQI or ACK/NACK) to be transmitted. Alternatively, a procedure may be used by which both types of information (e.g., CQI and ACK/NACK) are transmitted. More detail on one approach is given hereafter.

The UE 1302 may determine 1410 whether the CQI has a collision with ACK/NACK. For example, the UE 1302 may determine 1410 if the schedule of periodic CQI and the schedule of ACK/NACK overlap or if the CQI and ACK/NACK are scheduled to be transmitted simultaneously. In one configuration, such a collision may be represented by a collision indicator. If there is no collision between CQI and ACK/NACK, the UE 1302 may transmit 1412 CQI on the allocated resources (e.g., the CQI resources allocated according to the resource indicator or index). For example, only the CQI bits may be encoded and transmitted in this case.

If there is a collision between the schedule of periodic CQI and ACK/NACK (in the carrier aggregation (CA) mode), the UE 1302 may determine 1414 whether simultaneous reporting of CQI and ACK/NACK is permitted. For example, the UE 1302 may determine 1414 whether a simultaneous reporting indicator indicates that simultaneous reporting of CQI and ACK/NACK is permitted. For example, the UE 1302 may determine 1414 whether CQI-ReportConfig.CQI-Report Periodic.simultaneousAckNackAndCQI (from RRC signaling)='True'. If simultaneous reporting is not permitted, for example, CQI-ReportConfig.CQI-ReportPeriodic. simultaneousAckNackAndCQI='False'.

If simultaneous reporting is not permitted, the UE 1302 may drop 1416 CQI and transmit ACK/NACK on the allocated resources (according to the resource indicator or index, for example). For example, the CQI bits may be dropped and only the ACK/NACK bits may be encoded and transmitted. Furthermore, if a CQI transmission format is set to be Format 3, a collision occurs, the information element (IE) simultaneousAckNackAndCQI is set such that it allows the simultaneous transmission of ACK/NACK and CQI and only Primary Cell (PCell) transmission is received (e.g., all other Secondary Cells (SCells) are not received), then the CQI may be dropped 1416 and only ACK/NACK is transmitted on the resources allocated).

If simultaneous reporting is permitted, the UE 1302 may determine 1418 whether the ACK/NACK is set to be transmitted using Format 1a or Format 1b (Format 1a/1b) with channel selection. This determination 1418 may be made while the UE 1302 is in a Carrier Aggregation (CA) mode. If the ACK/NACK is set to be transmitted using Format 1a/1b with channel selection, the UE 1302 may determine 1440 whether compression (of ACK/NACK) is allowed. This determination 1440 may be based on RRC signaling. For example, the UE 1302 may use an ACK/NACK compression indicator to make this determination 1440. In another configuration, this determination 1440 may be made based on a subframe condition, such as the existence of a collision or the payload size of a Physical Uplink Control Channel (PUCCH). In yet another configuration, this determination 1440 may be made based on a combination of RRC signaling and the subframe condition.

If the UE 1302 determines 1440 that compression is not allowed, the UE 1302 may jointly encode 1430 CQI and ACK/NACK (or use Unequal Error Protection (UEP)). The UE 1302 may then transmit 1432 feedback (e.g., CQI and ACK/NACK) on Format 3 resources allocated for CQI.

If the UE 1302 determines 1440 that compression is allowed, the UE 1302 may optionally compress 1442 ACK/NACK to one or two bits using bundling techniques. In one configuration, for example, if the number of ACK/NACK bits is greater than one, then the UE 1302 may compress 1442 the ACK/NACK bits to one bit using bundling techniques, otherwise, no compression may be performed. In another configuration, if the number of ACK/NACK bits is greater than two, then the UE 1442 may compress 1442 the ACK/NACK bits to two bits, otherwise, no compression may be performed. Thus, the resulting number of ACK/NACK bits may be one or two bits whether compression is or is not used. For example, if the number of ACK/NACK bits is one or two without compression, then no compression may be performed.

The UE 1302 may determine 1438 whether extended CP is being used (which determination may be based on implicit or explicit Node B 146 signaling). If extended CP is being used (e.g., normal CP is not being used), the UE 1302 may perform one of two options. According to a first option, the UE 1302 may drop 1416 the CQI and transmit ACK/NACK on the allocated resources for transmission of ACK/NACK. According to a second option, the UE 1302 may jointly encode 1430 CQI and ACK/NACK (or use Unequal Error Protection (UEP)). The UE 1302 may then transmit 1432 feedback (e.g., CQI and ACK/NACK) on Format 3 resources.

When using Unequal Error Protection (UEP), the UE 1302 may provide greater error protection to one kind of information compared to another. For example, the UE 1302 may provide greater error protection to ACK/NACK than to CQI or vice-versa in encoding 1430 the CQI and/or ACK/NACK. For instance, ACK/NACK may be a more sensitive piece of information. Thus, greater protection may be provided to ACK/NACK while the CQI may be transmitted with less reliability. Greater error protection may be provided to one kind of information (e.g., ACK/NACK) by allocating more bits for redundancy or error protection. Using UEP may provide this distinction in performance requirement.

It should be noted that when ACK/NACK is using Format 1a/1b with channel selection, then the decision (to drop 1416 the CQI or the jointly encoded 1430 the CQI and ACK/NACK) may be implicitly indicated. For example, a Node B (e.g., base station, eNodeB, etc.) 146 may decode two sets of resources. A first set is resources allocated for Format 1a/1b with channel selection for transmission of ACK/NACK and resources allocated for CQI using Format 3. If the CQI is dropped 1416, then there may be nothing in the corresponding resources and only ACK/NACK is received on the resources allocated to ACK/NACK. However, if joint encoding 1430 is used, then the transmission takes place on the second set of resources, which are allocated for CQI transmission using Format 3.

If the UE 1302 determines 1438 that extended CP is not being used (e.g., normal CP is being used), then one of two procedures may be followed, depending on the number of ACK/NACK bits (e.g., one or two bits).

If there is one bit of ACK/NACK, a Binary Phase-Shift Keying (BPSK) modulation may be used to represent the ACK/NACK bit. The BPSK symbol may be embedded (and transmitted 1428) on the reference signal (RS) of the physical resource block (RB) allocated for transmission of CQI. This scheme may be referred to as Format 3a.

If there are two bits of ACK/NACK, a Quadrature Phase-Shift Keying (QPSK) modulation may be used to represent the ACK/NACK bits. The QPSK symbols may be embedded (and transmitted 1428) on the reference signal (RS) of the physical resource block (RB) allocated for transmission of CQI. This scheme may be referred to as Format 3b.

Thus, the UE 1302 may transmit 1428 (e.g., multiplex) the ACK/NACK on the reference signal (RS) of the resource block (RB) allocated for the transmission of CQI. This may be done using Format 3a for one bit of ACK/NACK and Format 3b for two bits of ACK/NACK.

If the UE 1302 determines 1418 that ACK/NACK is not set to be transmitted using Format 1a/1b with channel selection (e.g., ACK/NACK is set to be transmitted using Format 3), the UE 1302 may determine 1436 whether compression of ACK/NACK to fewer bits (e.g., one or two bits) is allowed (using a bundling technique, for example). For example, in one configuration, this determination 1436 may be made based on RRC signaling. For example, the UE 1302 may use an ACK/NACK compression indicator to make this determination 1436. In another configuration, this determination 1436 may be made based on a subframe condition, such as the existence of a collision or the payload size of a Physical Uplink Control Channel (PUCCH). In yet another configuration, this determination 1436 may be made based on a combination of RRC signaling and the subframe condition.

If the UE 1302 determines 1436 that compression of ACK/NACK is not allowed, then the UE 1302 may jointly encode 1434 CQI and ACK/NACK. In one configuration, if ACK/NACK compression is not performed and there are more than two bits of ACK/NACK, then the ACK/NACK bits may be jointly encoded 1434 with CQI bits. Unequal Error Protection (UEP) may be used as described above. The UE 1302 may transmit 1432 the feedback (e.g., the jointly encoded CQI an ACK/NACK feedback) using Format 3 resources for transmission of ACK/NACK.

If the UE 1302 determines 1436 that ACK/NACK compression is allowed, the UE 1302 may optionally compress 1424 ACK/NACK to one or two bits using bundling techniques. In one configuration, for example, if the number of ACK/NACK bits is greater than one, then the UE 1302 may compress 1424 the ACK/NACK bits to one bit using bundling techniques, otherwise, no compression may be performed. In another configuration, if the number of ACK/NACK bits is greater than two, then the UE 1302 may compress 1424 the ACK/NACK bits to two bits, otherwise, no compression may be performed. Thus, the resulting number of ACK/NACK bits may be one or two bits whether compression is or is not used. For example, if the number of ACK/NACK bits is one or two without compression, then no compression may be performed.

The UE 1302 may then determine 1426 whether normal CP is used. If normal CP is not used (e.g., extended CP is used for transmission of CQI), then the UE 1302 jointly encodes 1430 the CQI and ACK/NACK. Unequal error protection (UEP) may be used as described above. The UE 1302 may then transmit 1432 feedback (e.g., the joint CQI and ACK/NACK feedback) on Format 3 resources allocated for CQI.

If normal CP is used for the transmission of CQI, then one of two procedures may be followed, depending on the number of ACK/NACK bits (e.g., one or two bits).

If there is one bit of ACK/NACK, a Binary Phase-Shift Keying (BPSK) modulation may be used to represent the ACK/NACK bit. The BPSK symbol may be embedded (and transmitted 1428) on the reference signal (RS) of the physical resource block (RB) allocated for transmission of CQI. This scheme may be referred to as Format 3a.

If there are two bits of ACK/NACK, a Quadrature Phase-Shift Keying (QPSK) modulation may used to represent the ACK/NACK bits. The QPSK symbols may be embedded (and transmitted 1428) on the reference signal (RS) of the physical resource block (RB) allocated for transmission of CQI. This scheme may be referred to as Format 3b.

Thus, the UE 1302 may transmit 1428 (e.g., multiplex) the ACK/NACK on the reference signal (RS) of the resource block (RB) allocated for the transmission of CQI. This may be done using Format 3a for one bit of ACK/NACK and Format 3b for two bits of ACK/NACK. In summary, FIG. 14 illustrates one configuration of a method 1400 for transmission of CQI and collision resolution between transmission schedules of CQI and ACK/NACK.

As illustrated in FIG. 14, compression may be applied when Format 1a/1b with channel selection or when Format 3 is used, when the number of ACK/NACK bits are three or four bits, for example. In one configuration, Format 1a/1b may carry one, two, three or four bits of ACK/NACK.

Figure 15:
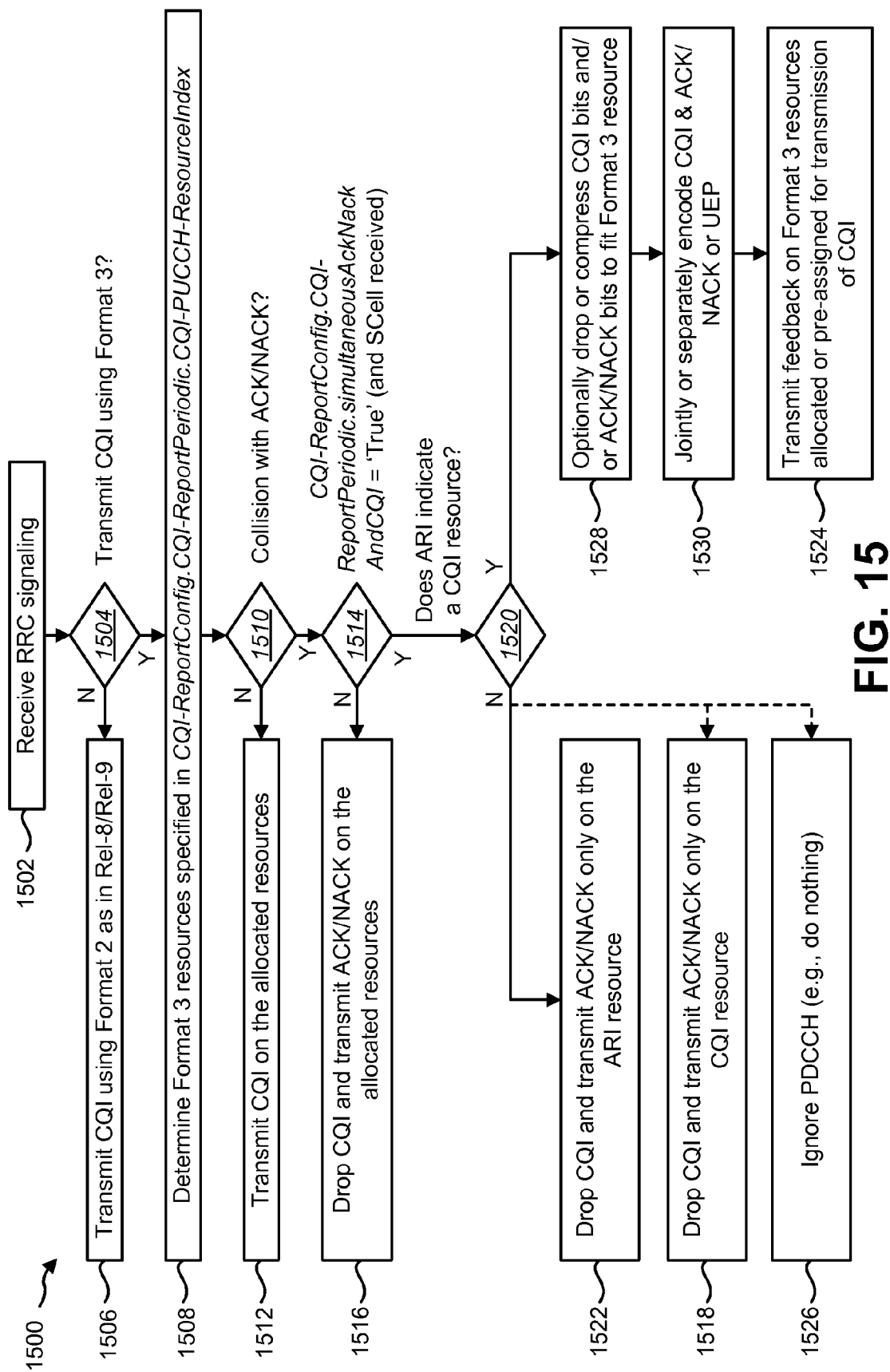
FIG. 15 is a flow diagram illustrating another configuration of a method for encoding feedback.

FIG. 15 is a flow diagram illustrating another configuration of a method 1500 for encoding feedback. More specifically, FIG. 15 illustrates a method 1500 for transmission of Channel Quality Indicator (CQI) and scheduling collision resolution between CQI and ACK/NACK transmission using a pre-assigned resource for CQI.

A UE 1302 may receive 1502 RRC signaling. For example, the RRC signaling may be generated and transmitted by a Node B 146 to the UE 1302. The UE 1302 may determine 1504 whether to transmit CQI using Format 3. This determination 1504 may be accomplished implicitly or explicitly, similar to that described above in connection with FIGS. 3-6. If the UE 1302 determines 1504 not to transmit CQI using Format 3 (or to transmit CQI using Format 2), then the UE 1302 may transmit 1506 CQI using Format 2. This may be done in accordance with Format 2 transmission as specified by 3GPP Release-8 and Release-9.

If the UE 1302 determines 1504 to transmit CQI using Format 3, the UE 1302 may determine 1508 Format 3 resources specified by a resource indicator or index (e.g., CQI-ReportConfig.CQI-ReportPeriodic.CQI-PUCCH-ResourceIndex). The resource indicator or index may be part of RRC signaling and indicates resources (e.g., Resource Blocks (RBs), etc.) that may be used by the UE 1302 to transmit feedback.

The systems and methods disclosed herein describe scheduling collision resolution between CQI and ACK/NACK. For example, the schedule for transmission of CQI may collide with the schedule for transmission of ACK/NACK in the uplink (UL). For instance, in 3GPP Release-10, although multiple resources may be allocated for transmission of CQI and ACK/NACK, only one resource may be used for transmission of the information. Therefore, either a mechanism may be needed to determine which information (e.g., CQI or ACK/NACK) is to be transmitted. Alternatively, a procedure may be used by which both types of information (e.g., CQI and ACK/NACK) are transmitted. More detail on another approach (different from the approach described above) is given hereafter.

The UE 1302 may determine 1510 whether the CQI has a collision with ACK/NACK. For example, the UE 1302 may determine 1510 if the schedule of periodic CQI and the schedule of ACK/NACK overlap or if the CQI and ACK/NACK are scheduled to be transmitted simultaneously. In one configuration, such a collision may be represented by a collision indicator. If there is no collision between CQI and ACK/NACK, the UE 1302 may transmit 1512 CQI on the allocated resources (e.g., the resources allocated according to the resource indicator or index). For example, only the CQI bits may be encoded and transmitted in this case.

If there is a collision between the schedule of periodic CQI and ACK/NACK (in the carrier aggregation (CA) mode), the UE 1302 may determine 1514 whether simultaneous reporting of CQI and ACK/NACK is permitted. For example, the UE 1302 may determine 1514 whether a simultaneous reporting indicator indicates that simultaneous reporting of CQI and ACK/NACK is permitted. For example, the UE 1302 may determine 1514 whether CQI-ReportConfig.CQI-Report Periodic.simultaneousAckNackAndCQI (from RRC signaling)='True'.

If simultaneous reporting is not permitted, the UE 1302 may drop 1516 CQI and transmit ACK/NACK on the allocated resources (according to the resource indicator or index, for example). For example, the CQI bits may be dropped and only the ACK/NACK bits may be encoded and transmitted. Furthermore, if a CQI transmission format is set to be Format 3, a collision occurs, the information element (IE) simultaneousAckNackAndCQI is set such that it allows the simultaneous transmission of ACK/NACK and CQI and only Primary Cell (PCell) transmission is received (e.g., all other Secondary Cells (SCells) are not received), then the CQI may be dropped 1516 and only ACK/NACK is transmitted on the resources allocated for transmission of periodic CQI.

If simultaneous reporting is permitted (and an SCell transmission is received), the UE 1302 may determine 1520 whether an ACK/NACK Resource Indication (ARI) indicates the same resource as a pre-assigned periodic CQI resource. In the approach illustrated in FIG. 15, Format 3 may be set to be used for ACK/NACK. When ACK/NACK is using Format 3, an ACK/NACK Resource Indication (ARI) may indicate Format 3 resources. It should be noted that in some cases when a collision occurs between periodic CQI and ACK/NACK, the Physical Downlink Control Channel (PDCCH) resource indication or ARI may be set equal to that of the pre-assigned periodic CQI resource. An ARI resource is the resource indicated by the ARI. ARI may be carried by a PDCCH and may indicate a Physical Uplink Control Channel (PUCCH) resource to transmit ACK/NACK.

If the ARI indicates a resource different from the pre-assigned CQI resource, the UE 1302 may perform one of three options. According to a first option, the UE 1302 may drop 1522 the CQI and transmit the ACK/NACK only on the ARI resource. For example, only the ACK/NACK may be encoded and transmitted in this case. It should be noted that this procedure may overwrite the RRC configuration of simultaneousAckNackAndCQI.

According to a second option, the UE 1302 may drop 1518 the CQI and transmit ACK/NACK only on the CQI resource. More specifically, the UE 1302 may drop 1518 the CQI and only transmit ACK/NACK on the pre-assigned CQI resource.

According to a third option, the UE 1302 may ignore 1526 a Physical Downlink Control Channel (PDCCH) (e.g., the UE 1302 may do nothing). In other words, when the ARI indicates the same resource as the CQI resource, the PDCCH may be dropped as this may indicate an incorrect PDCCH detection. That is, if the ARI does not indicate the same resources as the pre-assigned CQI resources, this may provide information such as an incorrect PDCCH detection (or that the CQI should be dropped as mentioned above, for example). Ignoring the PDCCH may implicitly indicate to the Node B 146 (e.g., eNodeB, base station, etc.) that the UE 1302 was unable to correctly receive the PDCCH.

It should also be noted that the ARI resource may be reserved for future use when there is an existing periodic CQI resource available for transmission. In the case of CQI and ACK/NACK being transmitted on the CQI resource, the Node B 146 (e.g., eNodeB) may use multiple hypothesis decoding to correctly decode the ACK/NACK and CQI bits.

If the UE 1302 determines 1520 that the ARI indicates the same resource as the pre-assigned CQI resource, the UE 1302 may optionally compress 1528 the CQI and ACK/NACK bits. The ARI resource may be used to indicate whether to compress ACK/NACK and/or CQI. Furthermore, whether or not compression is performed and the amount of compression performed may be based on Format 3 capacity. For example, if the total number of ACK/NACK and CQI bits is not greater than (e.g., is less or equal to) the number of bits that can be transmitted on Format 3, the UE 1302 may jointly or separately encode 1530 the CQI and ACK/NACK (or use UEP as described above). The UE 1302 may then transmit 1524 feedback (e.g., CQI and ACK/NACK) on Format 3 resources allocated or pre-assigned for transmission of CQI.

If the total number of ACK/NACK and CQI bits is greater than the number of bits that can be supported on the Format 3 resource, the UE 1302 may drop or compress 1528 some of the CQI bits.

The CQI may be compressed or dropped 1528 based on the relative importance of CQI. For instance, the CQI of higher quality (e.g., higher Signal to Noise Ratio (SNR)) carriers or cells 144 may be prioritized over lower quality carriers or cells 144. In other words, more bits may be allocated to more important CQI of better carriers or cells 144 compared to the CQI of other carriers or cells 144. Or, more bits may be allocated to more "important" CQI portions of the same carrier or cell 144 compared to less "important" CQI information of the same carrier or cell 144.

The UE 1302 may jointly or separately encode 1530 CQI and ACK/NACK. The UE 1302 may use unequal error protection as described above. The UE 1302 may transmit 1524 feedback (e.g., the separately or jointly encoded CQI and ACK/NACK) on Format 3 resources allocated or pre-assigned for transmission of CQI. In summary, if the UE 1302 determines 1520 that the ARI indicates the same resource as the pre-assigned CQI resource, then the UE 1302 may jointly transmit 1524 ACK/NACK and CQI with or without compression based on the Format 3 capacity.

Figure 16:
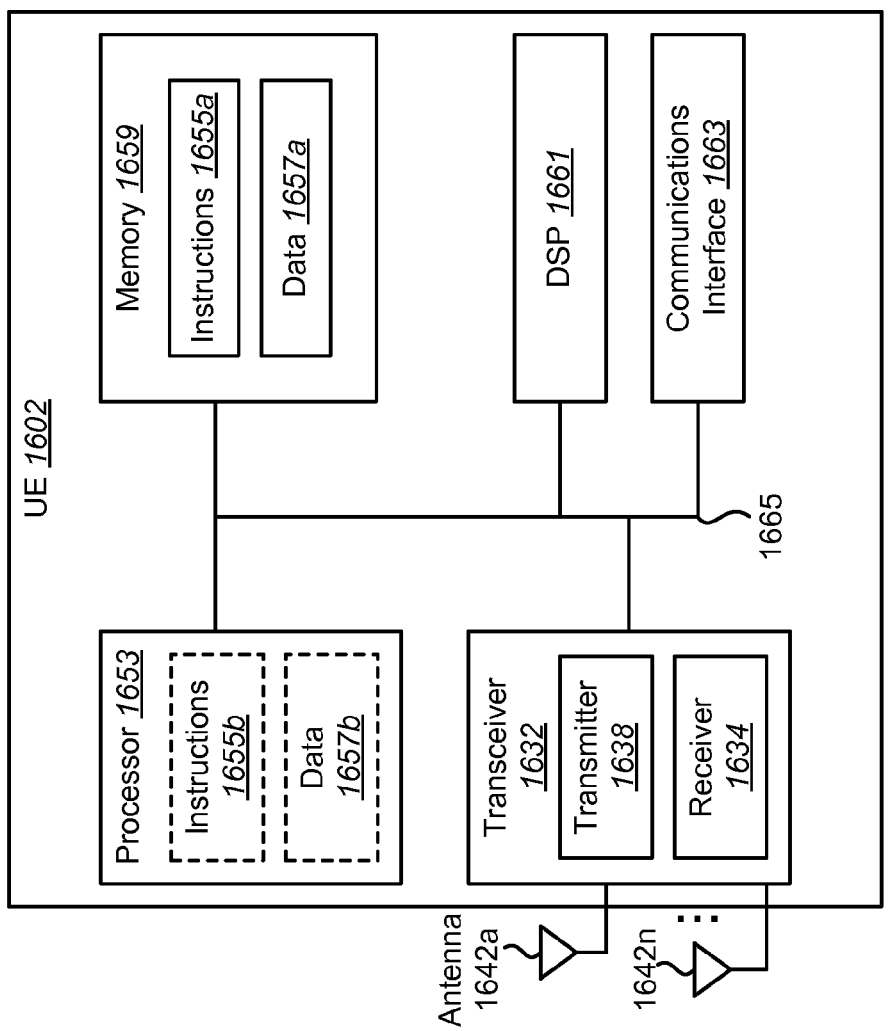
FIG. 16 illustrates various components that may be utilized in a User Equipment (UE)

FIG. 16 illustrates various components that may be utilized in a User Equipment (UE) 1602. The UE 1602 may be utilized as the UEs 102, 302, 502, 702, 902, 1302 described above. The UE 1602 includes a processor 1653 that controls operation of the UE 1602. The processor 1653 may also be referred to as a CPU. Memory 1659, which may include read-only memory (ROM), random access memory (RAM), a combination of the two or any type of device that may store information, provides instructions 1655a and data 1657a to the processor 1653. A portion of the memory 1659 may also include non-volatile random access memory (NVRAM). Instructions 1655b and data 1657b may also reside in the processor 1653. Instructions 1655b and/or data 1657b loaded into the processor 1653 may also include instructions 1655a and/or data 1657a from memory 1659 that were loaded for execution or processing by the processor 1653. The instructions 1655b may be executed by the processor 1653 to implement the systems and methods disclosed herein.

The UE 1602 may also include a housing that contains a transmitter 1638 and a receiver 1634 to allow transmission and reception of data. The transmitter 1638 and receiver 1634 may be combined into a transceiver 1632. One or more antennas 1642a-n are attached to the housing and electrically coupled to the transceiver 1632.

The various components of the UE 1602 are coupled together by a bus system 1665, which may include a power bus, a control signal bus, and a status signal bus, in addition to a data bus. However, for the sake of clarity, the various buses are illustrated in FIG. 16 as the bus system 1665. The UE 1602 may also include a digital signal processor (DSP) 1661 for use in processing signals. The UE 1602 may also include a communications interface 1663 that provides user access to the functions of the UE 1602. The UE 1602 illustrated in FIG. 16 is a functional block diagram rather than a listing of specific components.

Figure 17:
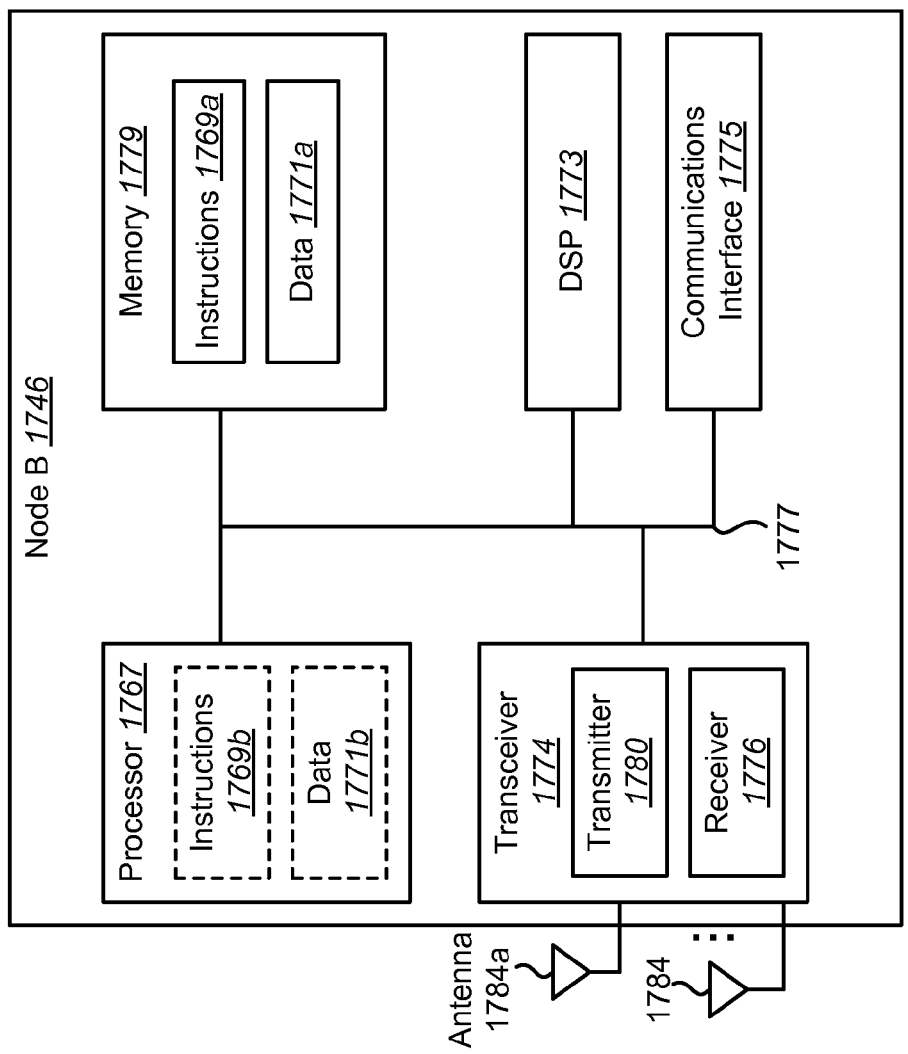
FIG. 17 illustrates various components that may be utilized in a Node B.

FIG. 17 illustrates various components that may be utilized in a Node B 1746. The Node B 1746 may be utilized as the Node B 146 illustrated previously. The Node B 1746 may include components that are similar to the components discussed above in relation to the UE 1602, including a processor 1767, memory 1779 that provides instructions 1769a and data 1771a to the processor 1767, instructions 1769b and data 1771b that may reside in or be loaded into the processor 1767, a housing that contains a transmitter 1780 and a receiver 1776 (which may be combined into a transceiver 1774), one or more antennas 1784a-n electrically coupled to the transceiver 1774, a bus system 1777, a DSP 1773 for use in processing signals, a communications interface 1775 and so forth.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A User Equipment (UE) configured for allocating resources and encoding for Channel Quality Indicator (CQI), comprising:
   a processor;
   memory in electronic communication with the processor;
   instructions stored in the memory, the instructions being executable to:
      receive Radio Resource Control (RRC) signaling;
      receive a reference signal;
      determine a Channel Quality Indicator (CQI) based on the reference signal;
      determine a format for CQI transmission and if use of Format 3 is determined, then:
         determine cells for CQI reporting based on the RRC signaling;
         determine an encoding;
         encode a feedback message based on the encoding; and
         transmit the feedback message.

2. The UE of claim 1, wherein determining a format is based on whether the UE is in a Carrier Aggregation (CA) mode.

3. The UE of claim 1, wherein determining a format is based on an explicit format indicator specified by the RRC signaling.

4. The UE of claim 1, wherein determining cells for CQI reporting is based on the RRC signaling, wherein the RRC signaling comprises CQI cell indices.

5. The UE of claim 1, wherein determining the encoding is based on a designated number of CQI bits.

6. The UE of claim 5, wherein the encoding is convolutional encoding if there are more than a threshold number of CQI bits and the encoding is a Reed-Muller encoding if there is the threshold number or fewer CQI bits.

7. The UE of claim 6, wherein the threshold number is 11.

8. The UE of claim 1, wherein determining the encoding is based on an explicit encoding indicator specified by the RRC signaling.

9. The UE of claim 8, wherein the encoding is a convolutional encoding if convolutional encoding is indicated by the explicit encoding indicator and the encoding is a Reed-Muller encoding if Reed-Muller encoding is indicated by the explicit encoding indicator.

10. The UE of claim 1, wherein determining the encoding is based on an encoding mode indicator, a number of CQI bits and an explicit encoding indicator, and wherein the instructions are further executable to:
    encode CQI bits using convolutional encoding if the encoding mode indicator indicates an implicit encoding mode and there are more than a designated number of CQI bits;
    encode the CQI bits using Reed-Muller encoding if the encoding mode indicator indicates an implicit encoding mode and there are less than or equal to the designated number of CQI bits;
    encode the CQI bits using convolutional encoding if the encoding mode indicator indicates an explicit encoding mode and the explicit encoding indicator indicates convolutional encoding; and
    encode the CQI bits using Reed-Muller encoding if the encoding mode indicator indicates an explicit encoding mode and the explicit encoding indicator indicates Reed-Muller encoding.

11. The UE of claim 1, wherein the instructions are further executable to, if the use of Format 3 for CQI transmission is determined:
    determine Format 3 resources specified by a resource indicator;
    determine whether there is a collision between the CQI and an Acknowledgment/Negative Acknowledgment (ACK/NACK); and
    determine whether simultaneous CQI and ACK/NACK reporting is permitted if there is a collision between the CQI and the ACK/NACK.

12. The UE of claim 11, wherein the instructions are further executable to, if simultaneous CQI and ACK/NACK reporting is not permitted:
    drop the CQI; and
    transmit the ACK/NACK.

13. The UE of claim 11, wherein the instructions are further executable to determine whether the ACK/NACK is set for transmission using Format 1a/1b with channel selection if simultaneous CQI and ACK/NACK reporting is permitted.

14. The UE of claim 13, wherein the instructions are further executable to, if ACK/NACK is not set for transmission using Format 1a or Format 1b with channel selection:
    determine whether ACK/NACK compression is allowed;
    jointly encode the CQI and the ACK/NACK if ACK/NACK compression is not allowed; and transmit the CQI and ACK/NACK using Format 3 ACK/NACK resources if ACK/NACK compression is not allowed.

15. The UE of claim 14, wherein the instructions are further executable to, if ACK/NACK compression is allowed:
   determine whether there is a normal Cyclic Prefix (CP);
   transmit the ACK/NACK using a Format 3a or a Format 3b if there is a normal CP;
   jointly encode the CQI and the ACK/NACK if there is not a normal CP; and
   transmit the CQI and the ACK/NACK using Format 3 CQI resources if there is not a normal CP.

16. The UE of claim 15, wherein the instructions are further executable to compress the ACK/NACK to fewer bits.

17. The UE of claim 13, wherein the instructions are further executable to, if ACK/NACK is set for transmission using Format 1a or Format 1b with channel selection:
   determine whether ACK/NACK compression is allowed;
   jointly encode the CQI and ACK/NACK if ACK/NACK compression is not allowed; and
   transmit the CQI and the ACK/NACK using Format 3 CQI resources if ACK/NACK compression is not allowed.

18. The UE of claim 17, wherein the instructions are further executable to, if ACK/NACK compression is allowed:
   determine whether there is an extended CP; and
   transmit the ACK/NACK using Format 3a or Format 3b if there is not an extended CP.

19. The UE of claim 18, wherein the instructions are further executable to compress the ACK/NACK to fewer bits.

20. The UE of claim 18, wherein the instructions are further executable to, if there is an extended CP:
   jointly encode the CQI and the ACK/NACK; and
   transmit the CQI and the ACK/NACK using Format 3 resources.

21. The UE of claim 18, wherein the instructions are further executable to, if there is an extended CP:
   drop the CQI; and
   transmit the ACK/NACK.

22. The UE of claim 11, wherein the instructions are further executable to provide unequal error protection between the CQI and the ACK/NACK if simultaneous CQI and ACK/NACK reporting is permitted.

23. The UE of claim 11, wherein the instructions are further executable to, if simultaneous CQI and ACK/NACK reporting is permitted:
   determine whether an ACK/NACK Resource Indicator (ARI) indicates a resource that is the same as a CQI resource; and
   drop the CQI and transmit the ACK/NACK on an ARI resource if the ARI does not indicate a resource that is the same as the CQI resource.

24. The UE of claim 11, wherein the instructions are further executable to, if simultaneous CQI and ACK/NACK reporting is permitted:
   determine whether an ACK/NACK Resource Indicator (ARI) indicates a resource that is the same as a CQI resource; and
   drop the CQI and transmit ACK/NACK on the CQI resource if the ARI does not indicate a resource that is the same as the CQI resource.

25. The UE of claim 11, wherein the instructions are further executable to, if simultaneous CQI and ACK/NACK reporting is permitted:
   determine whether an ACK/NACK Resource Indicator (ARI) indicates a resource that is the same as a CQI resource; and
   ignore a Physical Downlink Control Channel (PDCCH) if the ARI does not indicate a resource that is the same as the CQI resource.

26. The UE of claim 11, wherein the instructions are further executable to, if simultaneous CQI and ACK/NACK reporting is permitted:
   determine whether an ACK/NACK Resource Indicator (ARI) indicates a resource that is the same as a CQI resource;
   encode the CQI and the ACK/NACK if the ARI indicates a resource that is the same as the CQI resource; and
   transmit the CQI and the ACK/NACK if the ARI indicates a resource that is the same as the CQI resource.

27. The UE of claim 26, wherein encoding the CQI and the ACK/NACK comprises one selected from the group consisting of jointly encoding and separately encoding.

28. The UE of claim 11, wherein the instructions are further executable to compress or drop CQI bits based on a Format 3 capacity if simultaneous CQI and ACK/NACK reporting is permitted.

29. The UE of claim 11, wherein the instructions are further executable to compress or drop ACK/NACK bits based on a Format 3 capacity if simultaneous CQI and ACK/NACK reporting is permitted.

30. A method for allocating resources and encoding for Channel Quality Indicator (CQI), comprising:
   receiving Radio Resource Control (RRC) signaling;
   receiving a reference signal;
   determining a Channel Quality Indicator (CQI) based on the reference signal;
   determining, by a User Equipment (UE), a format for CQI transmission and if use of Format 3 is determined, then:
   determining, by the UE, cells for CQI reporting based on the RRC signaling;
   determining, by the UE, an encoding;
   encoding a feedback message based on the encoding; and
   transmitting the feedback message.

31. The method of claim 30, wherein determining a format is based on whether the UE is in a Carrier Aggregation (CA) mode.

32. The method of claim 30, wherein determining a format is based on an explicit format indicator specified by the RRC signaling.

33. The method of claim 30, wherein determining cells for CQI reporting is based on the RRC signaling, wherein the RRC signaling comprises CQI cell indices.

34. The method of claim 30, wherein determining the encoding is based on a designated number of CQI bits.

35. The method of claim 34, wherein the encoding is convolutional encoding if there are more than a threshold number of CQI bits and the encoding is a Reed-Muller encoding if there is the threshold number or fewer CQI bits.

36. The method of claim 35, wherein the threshold number is 11.

37. The method of claim 30, wherein determining the encoding is based on an explicit encoding indicator specified by the RRC signaling.

38. The method of claim 37, wherein the encoding is a convolutional encoding if convolutional encoding is indicated by the explicit encoding indicator and the encoding is a Reed-Muller encoding if Reed-Muller encoding is indicated by the explicit encoding indicator.

39. The method of claim 30, wherein determining the encoding is based on an encoding mode indicator, a number of CQI bits and an explicit encoding indicator, further comprising:

encoding CQI bits using convolutional encoding if the encoding mode indicator indicates an implicit encoding mode and there are more than a designated number of CQI bits;

encoding the CQI bits using Reed-Muller encoding if the encoding mode indicator indicates an implicit encoding mode and there are less than or equal to the designated number of CQI bits;

encoding the CQI bits using convolutional encoding if the encoding mode indicator indicates an explicit encoding mode and the explicit encoding indicator indicates convolutional encoding; and encoding the CQI bits using Reed-Muller encoding if the encoding mode indicator indicates an explicit encoding mode and the explicit encoding indicator indicates Reed-Muller encoding.

40. The method of claim 30, further comprising, if the use of Format 3 for CQI transmission is determined:

determining Format 3 resources specified by a resource indicator;

determining whether there is a collision between the CQI and an Acknowledgment/Negative Acknowledgment (ACK/NACK); and determining whether simultaneous CQI and ACK/NACK reporting is permitted if there is a collision between the CQI and the ACK/NACK.

41. The method of claim 40, further comprising, if simultaneous CQI and ACK/NACK reporting is not permitted:

dropping the CQI; and
transmitting the ACK/NACK.

42. The method of claim 40, further comprising determining whether the ACK/NACK is set for transmission using Format 1a/1b with channel selection if simultaneous CQI and ACK/NACK reporting is permitted.

43. The method of claim 42, further comprising, if ACK/NACK is not set for transmission using Format 1a or Format 1b with channel selection:

determining whether ACK/NACK compression is allowed;
jointly encoding the CQI and the ACK/NACK if ACK/NACK compression is not allowed; and
transmitting the CQI and ACK/NACK using Format 3 ACK/NACK resources if ACK/NACK compression is not allowed.

44. The method of claim 43, further comprising, if ACK/NACK compression is allowed:

determining whether there is a normal Cyclic Prefix (CP);
transmitting the ACK/NACK using a Format 3a or a Format 3b if there is a normal CP;
jointly encoding the CQI and the ACK/NACK if there is not a normal CP;
transmitting the CQI and the ACK/NACK using Format 3 CQI resources if there is not a normal CP.

45. The method of claim 44, further comprising compressing the ACK/NACK to fewer bits.

46. The method of claim 42, further comprising, if ACK/NACK is set for transmission using Format 1a or Format 1b with channel selection:

determining whether ACK/NACK compression is allowed;
jointly encoding the CQI and ACK/NACK if ACK/NACK compression is not allowed; and
transmitting the CQI and the ACK/NACK using Format 3 CQI resources if ACK/NACK compression is not allowed.

47. The method of claim 46, further comprising, if ACK/NACK compression is allowed:

determining whether there is an extended CP; and
transmitting the ACK/NACK using Format 3a or Format 3b if there is not an extended CP.

48. The method of claim 47, further comprising compressing the ACK/NACK to fewer bits.

49. The method of claim 47, further comprising, if there is an extended CP:

jointly encoding the CQI and the ACK/NACK; and
transmitting the CQI and the ACK/NACK using Format 3 resources.

50. The method of claim 47, further comprising, if there is an extended CP:

dropping the CQI; and
transmitting the ACK/NACK.

51. The method of claim 40, further comprising providing unequal error protection between the CQI and the ACK/NACK if simultaneous CQI and ACK/NACK reporting is permitted.

52. The method of claim 40, further comprising, if simultaneous CQI and ACK/NACK reporting is permitted:

determining whether an ACK/NACK Resource Indicator (ARI) indicates a resource that is the same as a CQI resource; and
dropping the CQI and transmit the ACK/NACK on an ARI resource if the ARI does not indicate a resource that is the same as the CQI resource.

53. The method of claim 40, further comprising, if simultaneous CQI and ACK/NACK reporting is permitted:

determining whether an ACK/NACK Resource Indicator (ARI) indicates a resource that is the same as a CQI resource; and
dropping the CQI and transmit ACK/NACK on the CQI resource if the ARI does not indicate a resource that is the same as the CQI resource.

54. The method of claim 40, further comprising, if simultaneous CQI and ACK/NACK reporting is permitted:

determining whether an ACK/NACK Resource Indicator (ARI) indicates a resource that is the same as a CQI resource; and
ignoring a Physical Downlink Control Channel (PDCCH) if the ARI does not indicate a resource that is the same as the CQI resource.

55. The method of claim 40, further comprising, if simultaneous CQI and ACK/NACK reporting is permitted:

determining whether an ACK/NACK Resource Indicator (ARI) indicates a resource that is the same as a CQI resource;
encoding the CQI and the ACK/NACK if the ARI indicates a resource that is the same as the CQI resource; and
transmitting the CQI and the ACK/NACK if the ARI indicates a resource that is the same as the CQI resource.

56. The method of claim 55, wherein encoding the CQI and the ACK/NACK comprises one selected from the group consisting of jointly encoding and separately encoding.

57. The method of claim 40, further comprising compressing or dropping CQI bits based on a Format 3 capacity if simultaneous CQI and ACK/NACK reporting is permitted.

58. The method of claim 40, further comprising compressing or dropping ACK/NACK bits based on a Format 3 capacity if simultaneous CQI and ACK/NACK reporting is permitted.

59. A non-transitory, tangible computer-readable medium for allocating resources and encoding for Channel Quality Indicator (CQI), comprising executable instructions for:

receiving Radio Resource Control (RRC) signaling;
receiving a reference signal;
determining a Channel Quality Indicator (CQI) based on the reference signal;
determining a format for CQI transmission and if use of Format 3 is determined, then:
determining cells for CQI reporting based on the RRC signaling;
determining an encoding;
encoding a feedback message based on the encoding; and
transmitting the feedback message.

* * * * *

UNITED STATES PATENT AND TRADEMARK OFFICE
CERTIFICATE OF CORRECTION

PATENT NO. : 8,437,705 B2
APPLICATION NO. : 12/902109
DATED : May 7, 2013
INVENTOR(S) : Ahmad Khoshnevis et al.

It is certified that error appears in the above-identified patent and that said Letters Patent is hereby corrected as shown below:

In the Specification

In column 6, line 23 please delete "spares, space2" and replace it with --spare3, spare2--.

In column 6, lines 25-26 please delete "-- Need ON OPTIONAL" and replace it with --OPTIONAL -- Need ON--.

In column 18, line 16 please delete "(e.g., Cal)" and replace it with --(e.g., CQI)--.

Signed and Sealed this
Nineteenth Day of November, 2013

Teresa Stanek Rea
*Deputy Director of the United States Patent and Trademark Office*